US008219619B2

(12) United States Patent
Hamada et al.

(10) Patent No.: US 8,219,619 B2
(45) Date of Patent: *Jul. 10, 2012

(54) DATA MANAGEMENT SERVER, DATA MANAGEMENT SYSTEM, DATA MANAGEMENT METHOD, AND PROGRAM

(75) Inventors: Gen Hamada, Tokyo (JP); Kazuto Horimatsu, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/088,951

(22) Filed: Apr. 18, 2011

(65) Prior Publication Data
US 2011/0196920 A1  Aug. 11, 2011

Related U.S. Application Data

(63) Continuation of application No. 11/935,108, filed on Nov. 5, 2007, now Pat. No. 7,937,469.

(30) Foreign Application Priority Data

Nov. 29, 2006  (JP) ............................... P2006-322286

(51) Int. Cl.
*G06F 15/16* (2006.01)
(52) U.S. Cl. ........... 709/205; 709/224; 700/83; 707/602
(58) Field of Classification Search .................... 709/205
See application file for complete search history.

(56) References Cited

U.S. PATENT DOCUMENTS

| 6,363,375 | B1 | 3/2002 | Hoshino et al. |
| 7,107,285 | B2 | 9/2006 | Von Kaenel et al. |
| 7,346,669 | B2 | 3/2008 | Anderson |
| 7,437,407 | B2 | 10/2008 | Vahalia et al. |
| 7,650,405 | B2 * | 1/2010 | Hood et al. .................... 709/224 |
| 7,734,590 | B2 | 6/2010 | Chand et al. |
| 7,797,351 | B2 | 9/2010 | Beck |
| 2003/0018607 | A1 | 1/2003 | Lennon et al. |

(Continued)

FOREIGN PATENT DOCUMENTS

| JP | 2000-112806 | 4/2000 |
| JP | 2002-251359 | 9/2002 |
| JP | 2002-312403 | 10/2002 |

(Continued)

OTHER PUBLICATIONS

Partial European Search Report Issued by European Patent Office in counterpart European Application No. EP 07121270, dated Jan. 2, 2012 (7 pages).

(Continued)

*Primary Examiner* — Firmin Backer
*Assistant Examiner* — Hamza Algibhah
(74) *Attorney, Agent, or Firm* — Finnegan, Henderson, Farabow, Garrett & Dunner, L.L.P.

(57) ABSTRACT

There is provided a data management server that is connectable to a plurality of content servers that store content data and metadata that includes content data attribute information and to a client device that acquires the content data based on the metadata. The data management server includes a data collection portion, a data processing portion, and a transmission portion. The data collection portion collects the metadata from each of the plurality of the content servers. The data processing portion hierarchically structures the metadata that the data collection portion collected, based on the attribute information that is included in the metadata. The transmission portion, in response to a request from the client device, transmits to the client device the metadata that was hierarchically structured by the data processing portion.

8 Claims, 22 Drawing Sheets

U.S. PATENT DOCUMENTS

| | | |
|---|---|---|
| 2003/0063770 A1 | 4/2003 | Svendsen et al. |
| 2004/0117358 A1* | 6/2004 | von Kaenel et al. ............... 707/3 |
| 2004/0122902 A1* | 6/2004 | Anderson ..................... 709/206 |
| 2004/0133606 A1* | 7/2004 | Miloushev et al. ........... 707/200 |
| 2005/0076056 A1 | 4/2005 | Paalasmaa et al. |
| 2005/0219594 A1* | 10/2005 | Miyamoto et al. ........... 358/1.13 |
| 2005/0251500 A1* | 11/2005 | Vahalia et al. ..................... 707/1 |
| 2006/0080353 A1* | 4/2006 | Miloushev et al. ........... 707/102 |
| 2006/0173892 A1* | 8/2006 | Beck ............................. 707/102 |
| 2006/0184532 A1* | 8/2006 | Hamada et al. ................. 707/10 |
| 2006/0242122 A1* | 10/2006 | DeVorchik et al. ............... 707/3 |
| 2007/0078537 A1* | 4/2007 | Chand et al. .................... 700/83 |
| 2008/0027953 A1* | 1/2008 | Morita et al. ................. 707/100 |
| 2008/0228713 A1* | 9/2008 | Emura et al. ...................... 707/3 |
| 2009/0037993 A1* | 2/2009 | Ano et al. ......................... 726/7 |

FOREIGN PATENT DOCUMENTS

| | | |
|---|---|---|
| JP | 2003-298659 | 10/2003 |
| JP | 2004-040759 | 2/2004 |
| JP | 2004-102767 | 4/2004 |
| JP | 2005-157800 | 6/2005 |
| JP | 2006-058948 | 3/2006 |
| JP | 2006-221438 | 8/2006 |
| JP | 2001-092749 | 4/2011 |

OTHER PUBLICATIONS

Notification of Reason(s) for Refusal, for Japanese Patent Application No. 2006-322286, Yoshiaki Kameya, et al. mailed Jan. 31, 2012.
Kahori Horiuchi, "DLNA Moves Like This", Nikkei Byte, Dec. 22, 2004, vol. No, 260, p. 56-63.

* cited by examiner

FIG.4

SERVER INFORMATION

| SERVER ID | SERVER NAME | IP ADDRESS | UUID | UPDATE INFORMATION |
|---|---|---|---|---|
| 001 | SERVER A | 192.168.130.76 | AF8CD239 | 12 |

FIG.6

CONTENT METADATA

| CONTENT ID | OBJECT ID | LINK ID | PARENT ID | CHILD ID | CONTENT URL | THUMBNAIL URL |
|---|---|---|---|---|---|---|
| 1001 | 142 | | 140 | | 192.168.130.76.xxxaaa··· | 192.168.130.76.xxxddd··· |
| | 154 | 142 | 152 | | | |
| 1002 | 144 | | 140 | | 192.168.130.76.xxxbbb··· | 192.168.130.76.xxxeee··· |
| 1003 | 156 | | 152 | | 192.168.130.76.xxxccc··· | 192.168.130.76.xxxfff··· |

FIG.7

CONTENT METADATA

| OBJECT ID | MEDIA CLASS | TITLE | ARTIST | ALBUM | GENRE | FORMAT |
|---|---|---|---|---|---|---|
| 142 | AUDIO | SHOWAJIMA | A-DASH | ELEVATOR | POP | MP3 |
| 144 | AUDIO | ONE SEPTEMBER | MINT | SEASON | ROCK | LPCM |
| 154 | AUDIO | SHOWAJIMA | A-DASH | ELEVATOR | POP | MP3 |
| 156 | AUDIO | UE O MUITE HASHIROU | A-DASH | ELEVATOR | POP | MP3 |

FIG.12

SERVER INFORMATION

| SERVER ID | SERVER NAME | IP ADDRESS | UUID | UPDATE INFORMATION | OPERATIONAL STATE |
|---|---|---|---|---|---|
| 001 | SERVER A | 192.168.130.76 | AF8CD239 | 11 | OPERATING |
| 002 | SERVER B | 192.168.130.78 | DDA8701B | 34 | OPERATING |
| 003 | SERVER C | 192.168.130.84 | CE4HDCA4 | 56 | STOPPED |

FIG.14

CONTENT METADATA

| OBJECT ID | MEDIA CLASS | TITLE | ARTIST | ALBUM | GENRE | FORMAT |
|---|---|---|---|---|---|---|
| 434 | AUDIO | SHOWAJIMA | A-DASH | ELEVATOR | POP | MP3 |
| 436 | AUDIO | ONE SEPTEMBER | MINT | SEASON | BALLAD | LPCM |
| 444 | AUDIO | SHOWAJIMA | A-DASH | ELEVATOR | POP | MP3 |
| 446 | AUDIO | UE O MUITE HASHIROU | A-DASH | ELEVATOR | POP | MP3 |

FIG.15

CONTENT METADATA

| CONTENT ID | OBJECT ID | LINK ID | PARENT ID | CHILD ID | CONTENT URL | THUMBNAIL URL | SERVER UUID |
|---|---|---|---|---|---|---|---|
| 1001 | 434 | | 432 | | 192.168.130.76.xxxaaa··· | 192.168.130.88.xxxabc··· | AF8CD239 |
| | 444 | 434 | 442 | | | | AF8CD239 |
| 1002 | 436 | | 432 | | 192.168.130.76.xxxbbb··· | 192.168.130.88.xxxdef··· | AF8CD239 |
| 1003 | 446 | | 442 | | 192.168.130.76.xxxccc··· | 192.168.130.88.xxxghi··· | AF8CD239 |

FIG.16

CONTENT METADATA

| CONTENT ID | OBJECT ID | LINK ID | PARENT ID | CHILD ID | CONTENT URL | THUMBNAIL URL | SERVER UUID |
|---|---|---|---|---|---|---|---|
| 1001 | 434 | | 432 | | 192.168.130.104.xxxaaa··· | 192.168.130.88.xxxabc··· | AF8CD239 |
| | 444 | 434 | 442 | | | | AF8CD239 |
| 1002 | 436 | | 432 | | 192.168.130.104.xxxbbb··· | 192.168.130.88.xxxdef··· | AF8CD239 |
| 1003 | 446 | | 442 | | 192.168.130.104.xxxccc··· | 192.168.130.88.xxxghi··· | AF8CD239 |

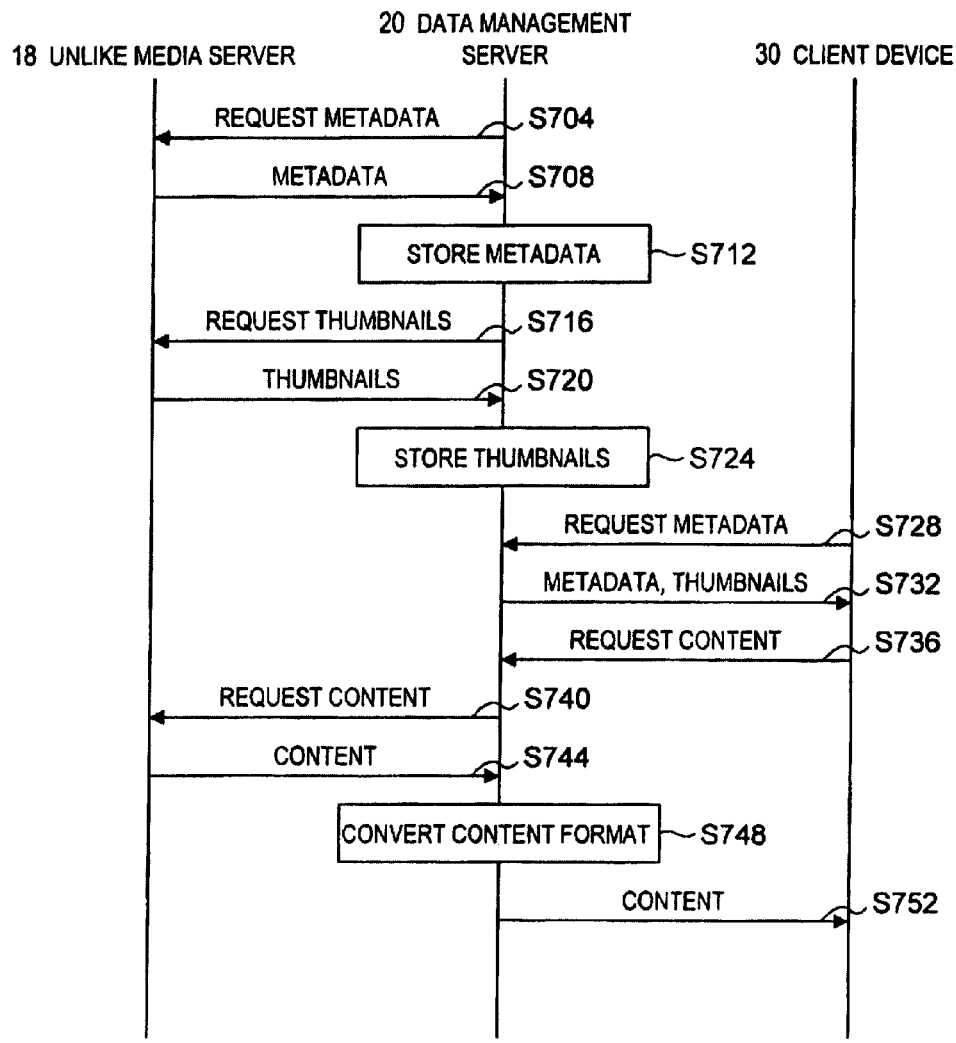

DATA MANAGEMENT SERVER, DATA MANAGEMENT SYSTEM, DATA MANAGEMENT METHOD, AND PROGRAM

CROSS REFERENCE TO RELATED APPLICATION

This application is a continuation of U.S. application Ser. No. 11/935,108, filed Nov. 5, 2007 now U.S. Pat. No. 7,937,469 (now allowed), which claims the benefit of priority to Japanese Patent Application JP 2006-322286 filed in the Japan Patent Office on Nov. 29, 2006, both of which are incorporated by reference herein.

BACKGROUND OF THE INVENTION

1. Field of the Invention

The present invention relates to a data management server, a data management system, a data management method, and a program.

2. Description of the Related Art

In recent years, the Digital Living Network Alliance (DLNA) guidelines have been proposed to make interoperability possible for content such as images, music, and the like in a home network that interconnects home audio-visual (AV) devices, personal computers (PCs), and the like. The DLNA guidelines define a digital media server (DMS, hereinafter called simply a "content server") that is provided with content storage and transmission functions and a digital media player (DMP, hereinafter called simply a "client device") that is provided with a content playback function.

The client device, in order to acquire and play back content, must search for desired content on a plurality of the content servers that are connected to the home network. The client device that complies with the DLNA guidelines can search for the content only on one content server at a time. Moreover, the client device cannot search for the content on a content server for which the power supply is not turned on.

To address this problem, a metadata collection system is disclosed in Japanese Patent Application Publication No. JP-A-2004-102767 in which a metadata collection server collects metadata for the content that is stored on the plurality of the content servers and the client device can search for the content that is stored on the plurality of the content servers just by accessing the metadata collection server.

SUMMARY OF THE INVENTION

However, for the known metadata collection server, consideration was not given to what sort of data structure would be used in storing the metadata that is collected from the plurality of the content servers. Therefore, if the metadata collection server simply uses the data structures on the plurality of the content servers, a user is forced to perform a complicated search operation.

Accordingly, the present invention addresses the problems described above to provide a new and improved data management server, a data management system, a data management method, and a program that can manage, in an integrated manner using a uniform data structure, the metadata for the content that is stored on the plurality of the content servers, regardless of where the content is located.

According to an embodiment of the present invention, there is provided a data management server that is connectable to a content server that stores content data and metadata that includes content data attribute information and to a client device that acquires the content data based on the metadata. The data management server is provided with a data collection portion, a data processing portion, and a transmission portion. The data collection portion collects the metadata from each of a plurality of the content servers. The data processing portion hierarchically structures the metadata that the data collection portion collected, based on the attribute information that is included in the metadata. The transmission portion, in response to a request from the client device, transmits to the client device the metadata that was hierarchically structured by the data processing portion.

In this configuration, the data collection portion collects from each of the content servers that are connected to the data management server the metadata that pertains to the content data that is stored on the content server. The data processing portion extracts the necessary metadata, for example, from the metadata that the data collection portion collected, then hierarchically structures the extracted metadata, based on the attribute information. The transmission portion transmits the hierarchically structured metadata to the client device in response to the request from the client device. The data management server thus manages, in an integrated manner, the metadata for the content data that is stored on the plurality of the content servers. The client device can therefore search for the content data that is stored on the plurality of the content servers simply by accessing the data management server. Moreover, because the data processing portion of the data management server hierarchically structures the metadata based on the attribute information, the client device can search for the content data without knowing on which of the content servers the content data is stored. That is, the data management server can make it possible for the client device to search for the content data without tracing it back through a different directory structure for each of the content servers.

The data management server may also be provided with a storage portion that stores the metadata that the data collection portion collected, and the data processing portion may also hierarchically structure the metadata that is stored in the storage portion, based on the attribute information that is included in the metadata. In this configuration, the data management server is provided with the storage portion stores the metadata that the data collection portion collected. Therefore, if the data management server collects the metadata from the content servers while the content servers are operating and stores the metadata in the storage portion, the data management server can provide the metadata for the content servers to the client device even during a time when the content servers have changed to a stopped state. The data processing portion hierarchically structures the metadata that is stored in the storage portion, for example, when there is a request from the client device to transmit the metadata. With this configuration, even if the content data that is stored on the content servers is updated very frequently, the processing load on the data management server can be limited by performing the hierarchical structuring processing when there is a request from the client device to transmit the metadata, instead of performing the hierarchical structuring processing in the data management server every time S the content data that is stored on the content servers is updated.

The data management server may also be provided with a storage portion that stores the metadata that the data collection portion collected and that the data processing portion hierarchically structures based on the attribute information that is included in the metadata. In this configuration, the data management server is provided with the storage portion stores the metadata that the data processing portion hierarchically structures. Therefore, if the data management server collects the metadata from the content servers while the content servers are operating and stores the hierarchically structured metadata for the content servers in the storage portion, the data management server can provide the metadata for the content servers to the client device even during a time when the content servers have changed to a stopped state. Moreover, the data processing portion can, for example, hierarchically structure the metadata that is stored in the storage portion before the metadata is stored in the storage portion. Therefore, when there is a request from the client device to transmit the metadata, the data management server can immediately transmit the hierarchically structured metadata that is stored in the storage portion.

The data processing portion may also hierarchically structure the metadata without regard to the content server from which the metadata was collected by the data collection portion. If this configuration is used, the client device can perform a search for the content data by accessing the data management server, even in a case where the client device cannot specify the content server where the desired content data is stored.

The metadata may also include a first thumbnail location information that indicates the location on the content server of thumbnail data that corresponds to the metadata. The data management server may also be provided with a thumbnail collection portion that collects the thumbnail data from the content servers, based on the first thumbnail location information. The data management server may also be provided with a storage portion that stores the metadata that includes the first thumbnail location information and stores the thumbnail information that the thumbnail collection portion collected. In this configuration, for example, if the metadata is collected and stored, the thumbnail collection portion collects the thumbnail data from the content servers, based on the first thumbnail location information that is included in the metadata. Furthermore, providing the storage portion makes it possible to store on the data management server the thumbnail data that the thumbnail collection portion collects.

When the thumbnail data is stored in the storage portion, the data processing portion may also change the first thumbnail location information to a second thumbnail location information that indicates the location of the thumbnail data in the storage portion. In this embodiment, the client device tries to acquire the thumbnail data based on the thumbnail data location information that is included in the metadata that the client device acquired. Therefore, if the thumbnail data location information that is included in the metadata indicates the location of the thumbnail data on the content server, the client device must access the content server to acquire the thumbnail data. However, in a case where the content server is not in operation, the client device cannot acquire the thumbnail data unless it purposely starts up the content server. Accordingly, changing the thumbnail data location information that is included in the metadata to indicate the location on the data management server makes it possible for the client device to acquire the thumbnail data from the data management server, regardless of the operational state of the content server.

The transmission portion may also transmit to the client device the thumbnail data that corresponds to the metadata that the transmission portion transmitted to the client device.

The data management server may also be provided with a conversion portion that converts the data format of the thumbnail data. In this configuration, for example, in a case where the data format of the thumbnail data that the data management server collected is not a data format that is compatible with the client device, the conversion portion can convert the thumbnail data to a data format that is compatible with the client device.

The data management server may also be provided with a content acquisition portion that acquires from the content servers content data with a data format that does not qualify as a standard format. The data management server may also be provided with a conversion portion that converts to a data format that qualifies as a standard format the data format of the content data that the content acquisition portion acquired. The transmission portion may transmit to the client device the content data whose data format was converted by the conversion portion.

Here, the client device can acquire the content data from the content servers, based on the content data location information that is included in the metadata that the client device acquired from the data management server. However, in a case where the data format of the content data that is stored on the content servers is a data format that is not compatible with the client device, the client device cannot play back the content data, even if it acquires the content data from the content servers. Accordingly, on the data management server, the content acquisition portion can acquire the content data whose data format does not qualify as a standard format, and the conversion portion can convert the data format of the content data that the content acquisition portion acquired to a data format that qualifies as a standard format. This makes it possible for the client device to acquire from the data management server the content data whose data format is compatible with the client device.

The content servers may also be digital media servers that conform to the DLNA guidelines, and the client device may be a digital media player that conforms to the DLNA guidelines.

According to another embodiment of the present invention, there is provided a data management system that includes a content server, a client device, and a data management server. The content server stores content data and metadata that includes content data attribute information and content data location information. The client device acquires the content data based on the metadata. The data management server is connectable to a plurality of the content servers and to the client device. The data management server is provided with a data collection portion, a data processing portion, and a transmission portion. The data collection portion collects the metadata from each of the plurality of the content servers. The data processing portion hierarchically structures the metadata that the data collection portion collected, based on the attribute information that is included in the metadata. The transmission portion, in response to a request from the client device, transmits to the client device the metadata that was hierarchically structured by the data processing portion. The client device is provided with a receiving portion and a content acquisition portion. The receiving portion receives the metadata that was hierarchically structured by the data processing portion. The content acquisition portion acquires the content data from the content servers, based on the location information that is included in the metadata that the receiving portion received.

According to another embodiment of the present invention, there is provided a data management method in a data management server that is connectable to a content server that stores content data and metadata that includes content data attribute information and to a client device that acquires the content data based on the metadata. The data management method includes a step of collecting the metadata from each of a plurality of the content servers, a step of hierarchically structuring the collected metadata, based on the attribute information that is included in the metadata, and a step of transmitting the hierarchically structured metadata to the client device in response to a request from the client device.

According to another embodiment of the present invention, there is provided a program that causes a computer to function as a data management server that is connectable to a plurality of content servers that store content data and metadata that includes content data attribute information and to a client device that acquires the content data based on the metadata. The data management server is provided with a data collection portion, a data processing portion, and a transmission portion. The data collection portion collects the metadata from each of the plurality of the content servers. The data processing portion hierarchically structures the metadata that the data collection portion collected, based on the attribute information that is included in the metadata. The transmission portion, in response to a request from the client device, transmits to the client device the metadata that was hierarchically structured by the data processing portion.

According to the embodiments of the present invention described above, the metadata for the content that is stored on the plurality of the content servers can be managed in an integrated manner using a uniform data structure, regardless of where the content is located.

BRIEF DESCRIPTION OF THE DRAWINGS

FIG. 4 is an explanatory figure that shows an example of server information according to the first embodiment;

FIG. 6 is an explanatory figure that shows an example of location information that is included in the metadata;

FIG. 7 is an explanatory figure that shows an example of attribute information that is included in the metadata;

FIG. 12 is an explanatory figure that shows an example of server information that is stored in a storage portion in association with an operational state;

FIG. 14 is an explanatory figure that shows an example of the attribute information in the hierarchically structured metadata on the data management server;

FIG. 15 is an explanatory figure that shows the metadata in which thumbnail URLs have been updated;

FIG. 16 is an explanatory figure that shows the metadata in which content URLs have been updated;

FIG. 22 is a sequence chart that shows a flow of a data management method in the data management system according to the second embodiment.

DETAILED DESCRIPTION OF THE PREFERRED EMBODIMENTS

Figure 1:
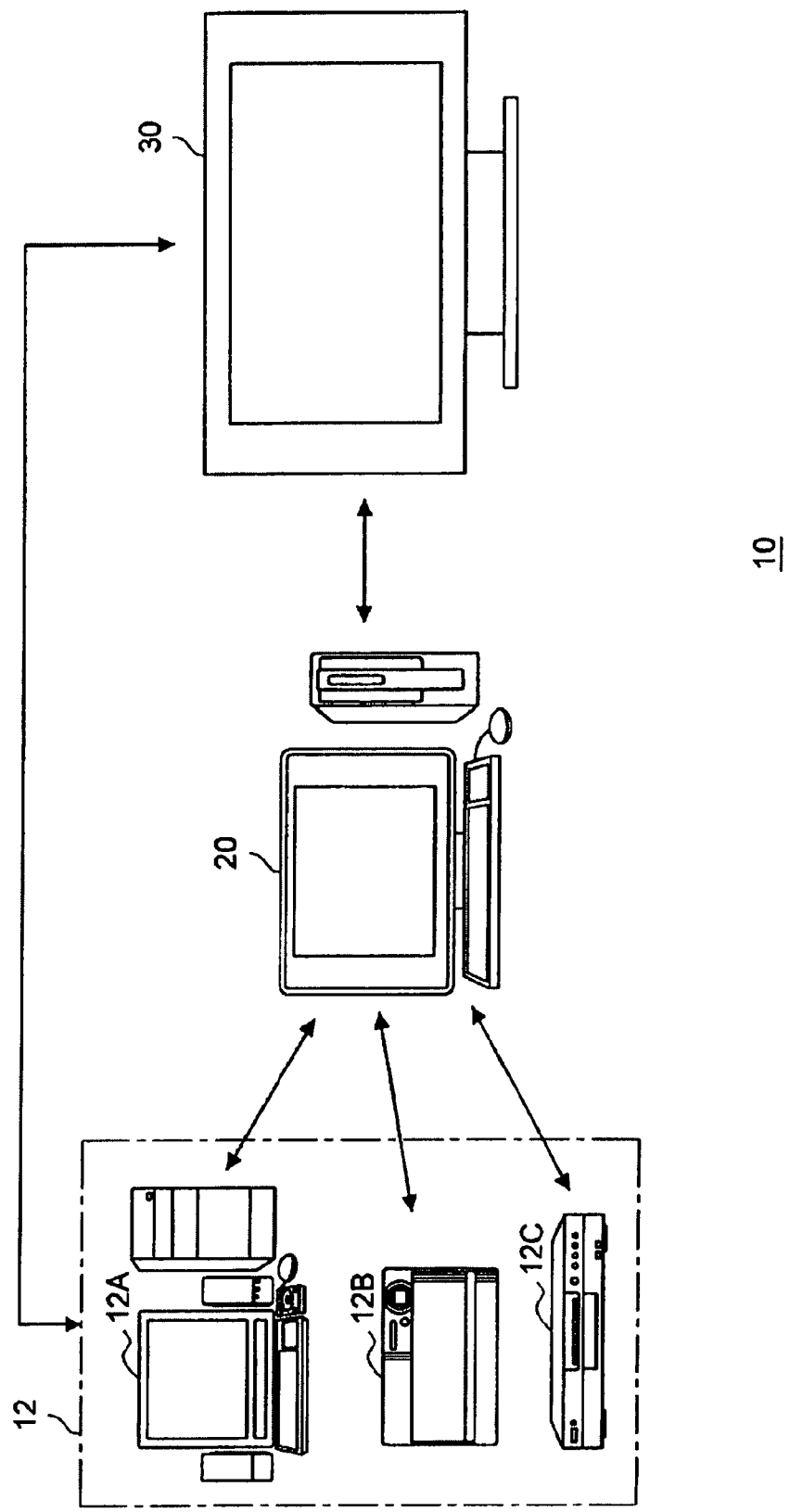
FIG. 1 is an explanatory figure that shows a configuration of a data management system according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

First Embodiment

A data management system 10 according to a first embodiment of the present invention will be explained with reference to FIGS. 1 and 2. Note that in the explanation of the present embodiment, after an overview of the data management system 10 is explained with reference to FIGS. 1 and 2, various configurations of the data management system 10 will be explained in detail with reference to FIGS. 3 to 19.

FIG. 1 is an explanatory figure that shows a configuration of the data management system 10 according to the present embodiment. The data management system 10 includes media servers 12, a data management server 20, and a client device 30.

The media servers 12 function as content servers that store content data (hereinafter simply called the "content"), metadata that indicates the nature of the content, thumbnail data for the content (hereinafter simply called the "thumbnails"), and server information that is information pertaining to the media servers 12. In FIG. 1, a personal computer, a digital camera, a digital versatile disc recordable (DVD) recorder are shown as examples of a media server 12A, a media server 12B, and a media server 12C, respectively. In this specification, where it is not specifically necessary to distinguish among the media servers 12A, 12B, and 12C, they shall be called simply the media server(s) 12.

The data management server 20 has functions that collect the metadata and the thumbnails from each of the media servers 12 and store the metadata and the thumbnails. The data management server 20 also transmits the metadata and the thumbnails to the client device 30 in response to requests from the client device 30.

The client device 30 acquires from the data management server 20 the metadata and the thumbnails that pertain to the content that is stored on the media servers 12. Here, the metadata includes content location information that indicates the location of the content that corresponds to the metadata. The client device 30 can acquire the desired content from the applicable media server 12 based on the content location information. In FIG. 1, a display device is shown as an example of the client device 30.

Next, the operation of the data management system 10 will be explained with reference to FIG. 2.

Figure 2:
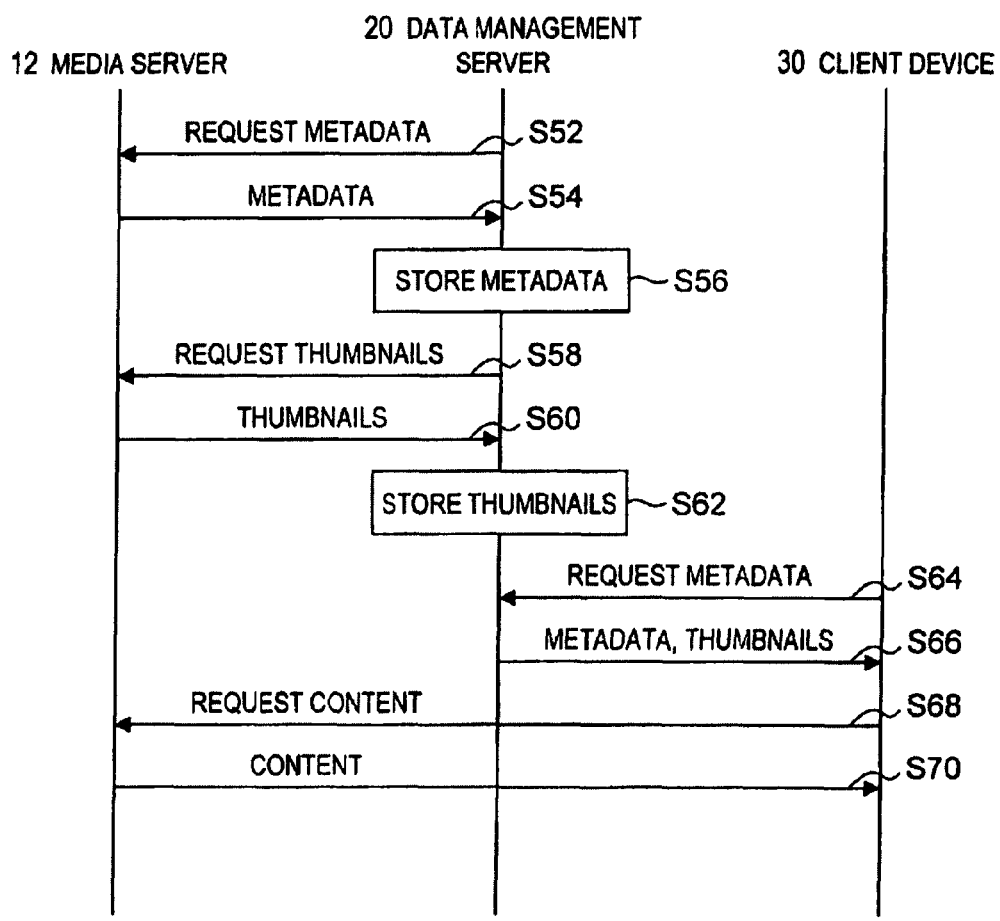
FIG. 2 is a sequence chart that shows an overall operation of the data management system according to the first embodiment.

FIG. 2 is a sequence chart that shows an overall operation of the data management system 10. First, the data management server 20, once it confirms the presence of the media server 12, requests the transmission of the metadata from the media server 12 (Step S52). In response to the metadata transmission request from the data management server 20, the media server 12 transmits to the data management server 20 the metadata that pertains to the content that is stored on the media server 12 (Step S54). Then the data management server 20 stores the metadata it has collected from the media server 12 (Step S56).

Next, the data management server 20 requests the transmission of the thumbnails from the media server 12, based on thumbnail location information that indicates the location of the thumbnails and that is contained in the collected metadata (Step S58). In response to the thumbnail transmission request from the data management server 20, the media server 12 transmits to the data management server 20 the thumbnails for the content that is stored on the media server 12 (Step S60). Then the data management server 20 stores the thumbnails it has collected from the media server 12 (Step S62). In FIG. 2, the media server 12 is shown as a single entity, but in fact, a plurality of the media servers 12 exists, and the data management server 20 performs the operations from Step S52 to Step S62 in relation to the plurality of the media servers 12.

Next, the client device 30 requests that the data management server 20 transmit the metadata (Step S64). In response to the metadata transmission request, the data management server 20 transmits the metadata and the thumbnails to the client device 30 (Step S66).

Next, based on the content location information that is contained in the metadata that was acquired from the data management server 20, the client device 30 requests that the applicable media server 12 transmit the content (Step S68). In response to the content transmission request from the client device 30, the media server 12 transmits the content to the client device 30 (Step S70).

Thus, in the data management system 10 according to the present embodiment, when a user wants to play back content on the client device 30, the location of the desired content can be specified by searching the metadata that is stored on the data management server 20, even if the user does not know on which of the media servers 12 the content in question is stored. Furthermore, because the metadata for the media servers 12 can be collected and stored while the media servers 12 are operating, the metadata for the applicable media server 12 can be provided to the client device 30 even while the applicable media server 12 is in a stopped state.

Note that the content described above is a concept that encompasses any sort of data, for example, audio data, including music, lectures, radio programs, and the like, visual data, including movies, television programs, video programs, photographs, paintings, charts, and the like, and other data, such as games, software, and the like.

Furthermore, a personal computer, a digital camera, and a DVD recorder are shown in FIG. 1 as examples of the media server 12, but the media server 12 may be any device that is provided with functions for storing and transmitting content and metadata, as well as other functions. For example, the media server 12 may be an information processing device, such as a home image processing device (video deck or the like), a mobile telephone, a Personal Handyphone System (PHS), a mobile audio playback device, a mobile image processing device, a personal digital assistant (PDA), a home game device, a mobile game device, a household electrical device, or the like. In the same manner, in FIG. 1, a personal computer is shown as an example of the data management server 20, and a display device is shown as an example of the client device 30, but the data management server 20 and the client device 30 can also be configured from the information processing devices described above.

Furthermore, the data management system 10 according to the present embodiment may also be configured in a home network that complies with the Digital Living Network Alliance (DLNA) guidelines and the Universal Plug and Play (UPnP™) standards. For example, even if the media server 12 is configured as a digital media server (DMS) that complies with the DLNA guidelines, the client device 30 may also be configured as a digital media player (DMP) that complies with the DLNA guidelines. Moreover, the data management server 20 may also be configured such that it is provided with the functions of both a digital media server and a digital media player that comply with the DLNA guidelines.

Next, the configuration of the media server 12 will be explained in detail with reference to FIGS. 3 to 9.

Figure 3:
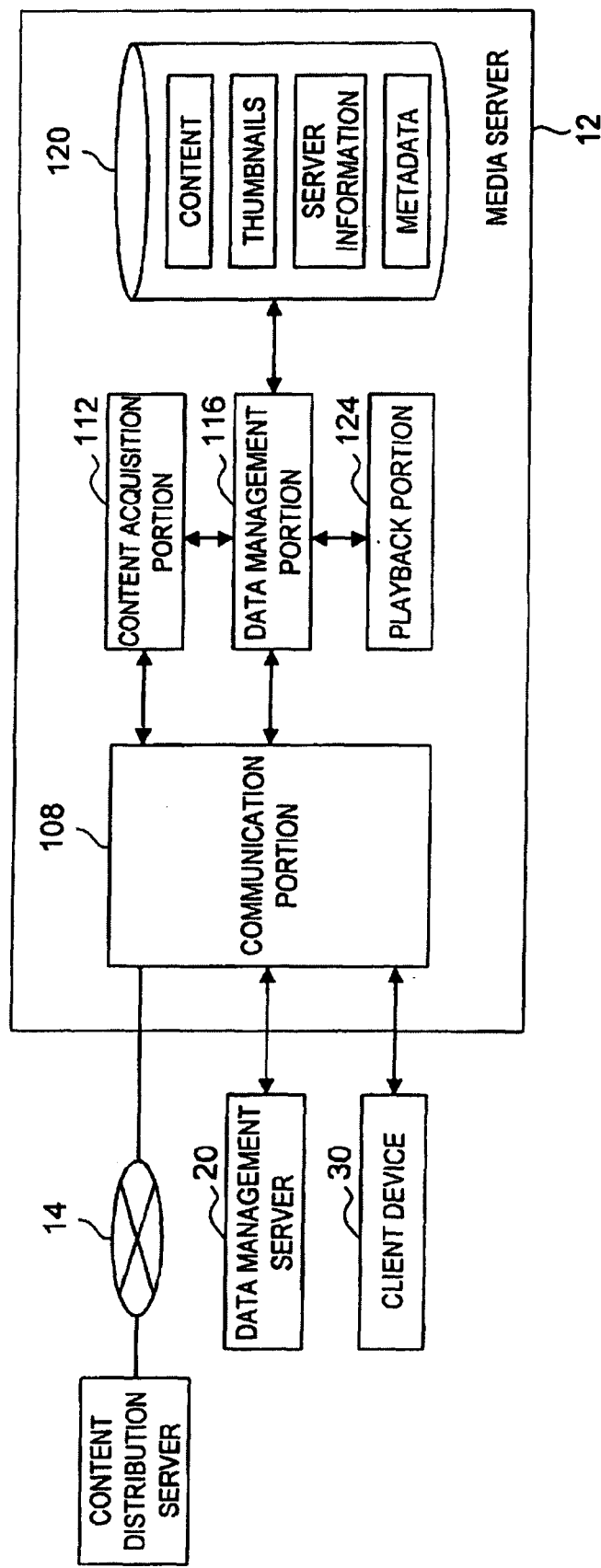
FIG. 3 is a block diagram that shows a configuration of a media server according to the first embodiment.

FIG. 3 is a block diagram that shows the configuration of a media server 12. The media server 12 includes a communication portion 108, a content acquisition portion 112, a data management portion 116, a storage portion 120, and a playback portion 124.

The communication portion 108 is an interface with a communication network 14, the data management server 20, the client device 30, and the like and has the functions of a transmission portion and a receiving portion. For example, the communication portion 108 receives the content from the communication network 14, transmits the metadata and the thumbnails to the data management server 20, and transmits the content to the client device 30. The communication portion 108 may also be configured as software, and it may also be configured as hardware, such as a communication device that is compatible with a local area network (LAN), a communication device that is compatible with Wireless USB, a wired communication device that performs communication using wires, and the like.

The content acquisition portion 112 has a function that acquires the content from an external source. For example, the content acquisition portion 112 can acquire the content from a content distribution server, and it may acquire the content that is stored in a storage medium. The storage medium may be, for example, a non-volatile memory such as an electrically erasable programmable read-only memory (EEPROM), an erasable programmable read-only memory (EPROM), or the like, a magnetic disk such as a hard disk, a floppy® disk, or the like, an optical disk such as a compact disc recordable (CD-R), a compact disc rewritable (CD-RW), a digital versatile disc recordable (DVD-R), a digital versatile disc rewritable (DVD-RW), a dual-layer digital versatile disc recordable (DVD+R), a dual-layer digital versatile disc rewritable (DVD+RW), a digital versatile disc random access memory (DVD-RAM), a Blu-ray™ disc recordable (BD-R), a dual-layer Blu-ray™ disc recordable (BD-RE), or the like, or a magneto-optical (MO) disk or the like.

The data management portion 116 writes data to the storage portion 120 and reads data from the storage portion 120. For example, the data management portion 116, in accordance with prescribed rules, writes to the storage portion 120 the content that is acquired by the content acquisition portion 112, together with the metadata and the thumbnails. In addition, when the data management server 20 requests the transmission of the metadata, the data management portion 116 reads the metadata from the storage portion 120. Moreover, when the client device 30 requests the transmission of the content, the data management portion 116 can read the content from the storage portion 120.

The storage portion 120 stores the content, the thumbnails, the server information, and the metadata. The playback portion 124 can play back the content that is read from the storage portion 120 by the data management portion 116. The content, as described above, is a concept that encompasses audio, motion pictures, still images, and the like. The thumbnails are reduced-size images that show the nature of the content. A thumbnail may be an album jacket or, in a case where the content is a motion picture, one scene from the motion picture. The server information is information that pertains to the media server 12. The server information will be explained below with reference to FIG. 4.

FIG. 4 is an explanatory figure that shows an example of the server information. The server information includes a server ID, a server name, an Internet Protocol (IP) address, a Universally Unique Identifier (UUID), and update information. The server ID is information that the data management system 10 uses to identify each of the media servers 12. The server name is a name that is assigned to each of the media servers 12, based on a user setting, for example.

The IP address is information that identifies each device that is connected to the Internet. The UUID is general-purpose identification information that is uniquely assigned to each media server 12 and to each type of device. The update information is information that changes whenever any information that is stored in the storage portion 120 of the media server 12 is updated and that makes it possible to confirm that a certain piece of information was updated. For example, the update information may indicate a number of updates and may indicate an update time.

Specifically, the example shown in FIG. 4 illustrates a case in which the server ID of the media server 12 is "001", the server name is "Server A", the IP address is "192.168.130.76", the UUID is "AF8CD239", and the update information is "12". Note that the format in which each item in FIG. 4 is expressed may be simple. For example, the UUID may be expressed in 128-bit format. Note also that in this specification, the update information indicates the number of times that the storage portion 120 of the media server 12 has been updated. Note that the server information may also include a Media Access Control (MAC) address.

The metadata that is stored in the storage portion 120 includes location information, which includes the content location information that indicates the location of the content and the thumbnail location information that indicates the location of the thumbnail information, and attribute information that indicates the title of the content, as well as the type of the content, such as its genre or the like. The metadata is structured hierarchically by the data management portion 116, and the hierarchically structured metadata is stored hierarchically in the storage portion 120. Structuring the metadata hierarchically means, for example, that the metadata for each content file is associated with at least one node that is a component of a tree structure. The hierarchical structure of the metadata that is stored in the storage portion 120 will be explained below with reference to FIG. 5.

Figure 5:
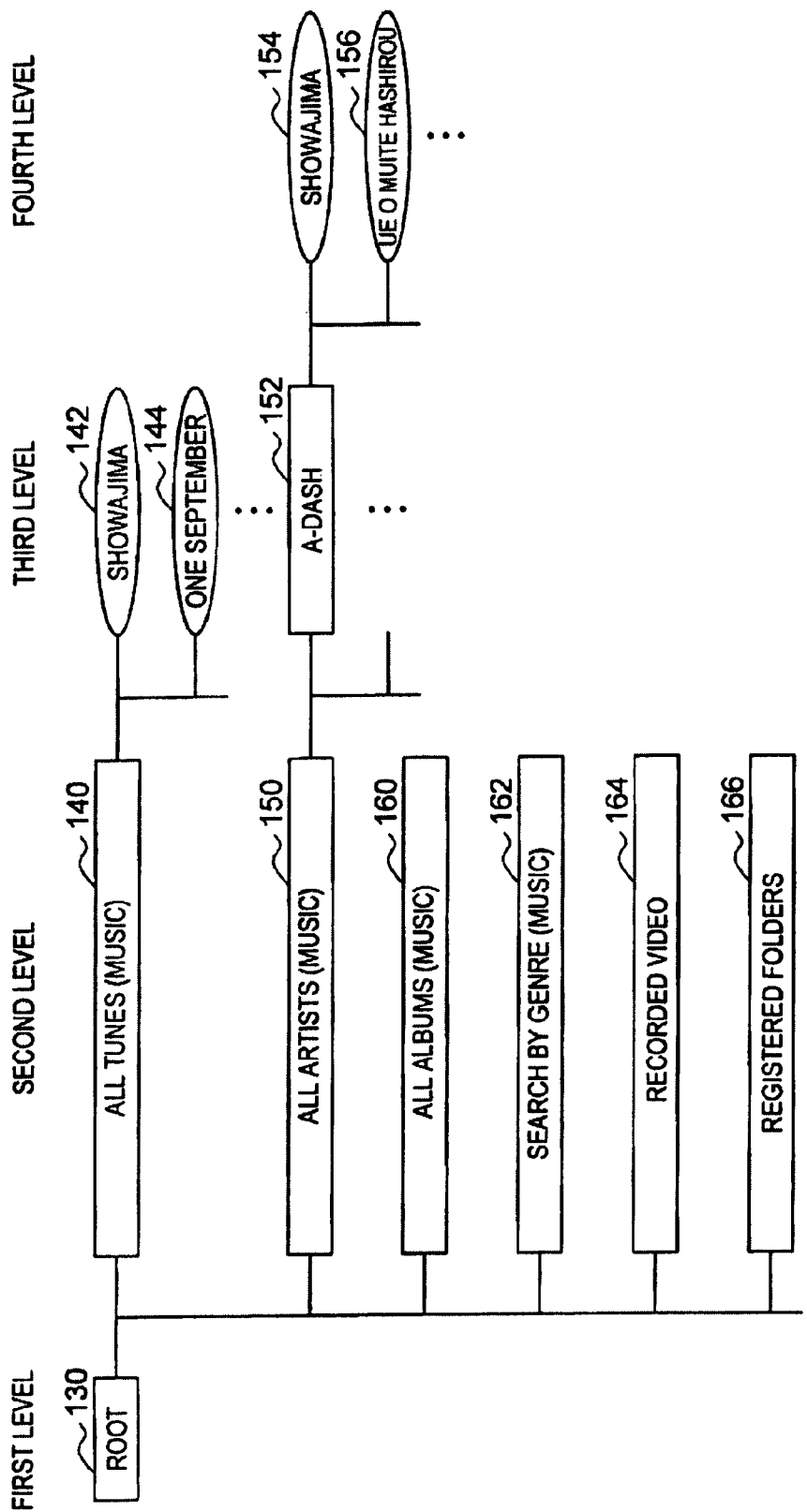
FIG. 5 is an explanatory figure that shows an example of a hierarchical structure of metadata that is stored in the media server according to the first embodiment.

FIG. 5 is an explanatory figure that shows an example of the hierarchical structure of the metadata that is stored in the media server 12. In the example of the hierarchical structure shown in FIG. 5, a Root 130 is positioned at a first-level node. The Root 130 is a node that does not have a node at a higher level. A plurality of containers are positioned at second-level nodes that are subordinate to the first level. Specifically, containers called All Tunes 140, All Artists 150, All Albums 160, Search by Genre 162, Recorded Videos 164, Registered Folders 166, and the like are positioned at the second-level nodes. Note that the containers may be containers as defined by the UPnP AV Content Directory Service or may be nodes that have subordinate nodes.

All of the metadata for the audio content that is stored in the storage portion 120 is positioned at the third-level node that is subordinate to the All Tunes 140 node, the examples shown in FIG. 5 being "Showajima" 142 and "One September" 144. Content directories for each artist in the audio content that is stored in the storage portion 120 are positioned at the third-level nodes that are subordinate to the All Artists 150 node, the example shown in FIG. 5 being "A-DASH" 152.

The metadata for the audio content that is stored in the storage portion 120 and for which the artist is "A-DASH" is positioned at the fourth-level node that is subordinate to the "A-DASH" 152 node, the examples shown in FIG. 5 being "Showajima" 154 and "Ue o Muite Hashirou" 156. In the same manner, the containers and the content metadata are positioned at nodes that are subordinate to the All Albums 160, Search by Genre 162, Recorded Videos 164, and Registered Folders 166 nodes.

In this manner, the data management portion 116 can structure the metadata hierarchically by associating the metadata for any given content with object IDs that are identification information for various nodes (containers or content metadata records). That is, positioning a metadata record at or allotting a metadata record to a node is equivalent to associating the metadata record with the object ID for the node. In this specification, for the sake of convenience in explaining the present invention, the object ID for any given node shall be the same as the reference numeral assigned to that container or content metadata record in FIG. 5. For example, the object ID for "Showajima" 142 on the third level in FIG. 5 shall be "142". An example of the metadata that is associated with the object ID will be explained below with reference to FIGS. 6 and 7.

FIG. 6 is an explanatory figure that shows an example of the location information that is included in the metadata. FIG. 7 is an explanatory figure that shows an example of the attribute information that is included in the metadata.

Referring to FIG. 6, the location information includes a content ID, the object ID, a link ID, a parent ID, a child ID, a content Uniform Resource Locator (URL), and a thumbnail URL. The content ID is information by which the content that is stored on the media server 12 can be identified. FIG. 6 illustrates a case where the content ID for "Showajima" is "1001", the content ID for "One September" is "1002", and the content ID for "Ue o Muite Hashirou" is "1003".

The object ID, as described above, is information for identifying the node at which a metadata record is positioned in a hierarchical tree structure data arrangement. Therefore, even though there is only one content file titled "Showajima" that is stored on the media server 12, there will be cases where the metadata for "Showajima" will be allotted to a plurality of the nodes in the tree structure data arrangement shown in FIG. 5 and will be associated with a plurality of the object IDs. Specifically, "Showajima", with the content ID "1001", is associated with the object IDs "142" and "154". "One September", with the content ID "1002", is associated with the object ID "144". "Ue o Muite Hashirou", with the content ID "1003", is associated with the object ID "156".

In the tree structure data arrangement in which the metadata for a single content file is allotted as a plurality of the metadata records to a plurality of the nodes, in a case where one of the metadata records serves as a main metadata record, the link ID is carried in the other metadata records and is the object ID of the node for the main metadata record. In FIG. 5, the metadata for "Showajima" is allotted to a plurality of the nodes, so in FIG. 6, the metadata record that is associated with the object ID "142" serves as the main metadata record, and in the metadata record that is associated with the object ID "154", the link ID is "142", the object ID of the node for the main metadata record.

The parent ID is the object ID of the higher-level node for the node to which the metadata record is allotted. Specifically, in the example shown in FIG. 5, the All Tunes container, with the object ID "140", is at the higher-level node for the "Showajima" record that has the object ID "142", so the parent ID is "140" in the "Showajima" record with the object ID "142". In the same manner, the parent ID is "140" in the "One September" record that has the object ID "144", the parent ID is "152" in the "Showajima" record that has the object ID "154", and the parent ID is "152" in the "Ue o Muite Hashirou" record that has the object ID "156".

The child ID is the object ID of a subordinate node for the node to which the metadata record is allotted. Specifically, in the example shown in FIG. 5, the "Showajima" record that has the object ID "142", the "One September" record that has the object ID "144", the "Showajima" record that has the object ID "154", and the "Ue o Muite Hashirou" record that has the object ID "156" are themselves all at the lowest level, so they have no child IDs. On the other hand, the All Tunes container that has the object ID "140" carries the child IDs "142", which is the object ID for the "Showajima" record, and "144", which is the object ID for the "One September" record.

The content URL is the content location information that indicates the location of the content that corresponds to the metadata. A portion of the URL includes the IP address of the media server 12 where the content is stored. For example, as shown in FIG. 6, the content URLs for the content that is stored on the media server 12 for which the IP address is 192.168.130.76 may be in the form 192.168.130.76.xxxaaa . . . , which includes the IP address at the beginning. The thumbnail URL, in the same manner as the content URL, is the thumbnail location information that indicates the location of the thumbnail for the content that corresponds to the metadata.

Referring to FIG. 7, the attribute information includes the object ID, a media class, a title, an artist, an album, a genre, and a format.

The media class is information that indicates the type of media in which the content is expressed, such as audio, images, photographs, and the like. The title is the title of the content. The artist is information that indicates the singer, performer, or the like for audio content. The album is information that indicates the name of the album that contains the content. The genre is information that indicates a category according to the nature of the content, such as pop, rock, jazz, movie soundtrack, classical, house, techno, action, science fiction, horror, comedy, suspense, or the like.

The format is information that indicates the data format of the content. Examples of data formats include Joint Photographic Experts Group (JPEG), MPEG1, MPEG2, MPEG4, and the like for image compression formats and MPEG1 Audio Layer 3 (MP3), Linear PCM (LPCM), Advanced Audio Coding (AAC), Windows Media Audio 9 (WMA9), Adaptive Transform. Acoustic Coding (ATRAC), ATRAC3, and the like for audio compression formats.

For example, in FIG. 7, for the content with the object ID "142", the media class is "Audio", the title is "Showjima", the artist is "A-DASH", the album is "Elevator", the genre is "Pop", and the format is "MP3".

Note that the hierarchical structure of the metadata was explained above with reference to FIG. 5, but there are cases where the hierarchical structure is not the same in each of the media servers 12. For example, the media server 12A has the hierarchical structure that is shown in FIG. 5, but it is also conceivable for the media server 12B and the media server 12C to have the hierarchical structures that are shown in FIGS. 8 and 9, as explained below.

Figure 8:
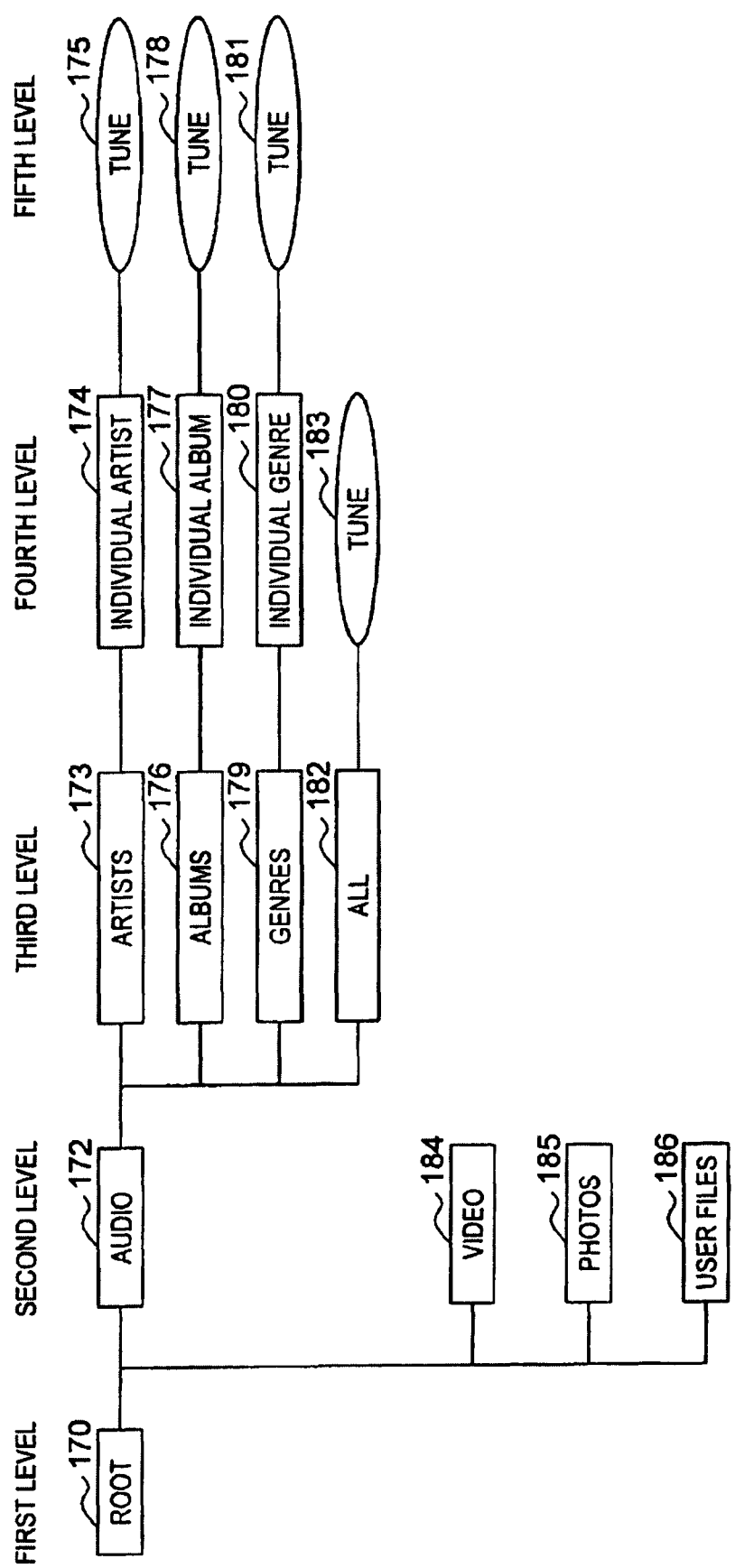
FIG. 8 is an explanatory figure that shows another example of a data arrangement in the hierarchically structured metadata.
Figure 9:
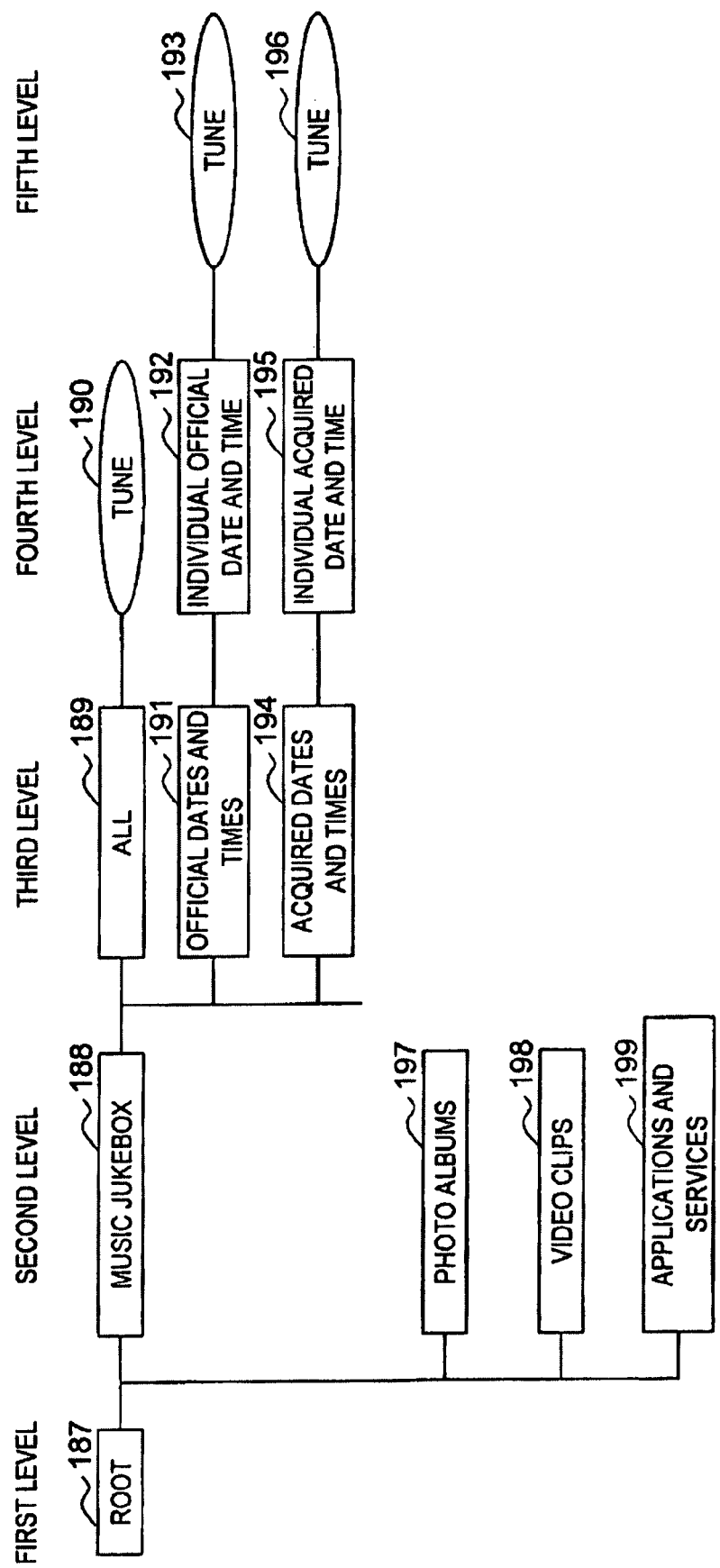
FIG. 9 is an explanatory figure that shows another example of a data arrangement in the hierarchically structured metadata.

FIG. 8 is an explanatory figure that shows another example of a data arrangement of the hierarchically structured metadata. In the example shown in FIG. 8, a Root 170 is positioned at a first level, and containers such as an Audio 172, a Video 184, a Photos 185, a User Files 186, and the like that are subordinate to the Root 170 are positioned at a second level.

Furthermore, containers such as an Artists 173, an Albums 176, a Genres 179, an All 182, and the like that are subordinate to the Audio 172 are positioned at a third level. Moreover, a plurality of Individual Artists 174 that are subordinate to the Artists 173, and each of which is a container for an individual artist, are positioned at a fourth level. Additionally, a plurality of Tunes 175 are positioned at a fifth level that are content and are subordinate to each of the Individual Artists 174.

Further, a plurality of Individual Albums 177 that are subordinate to the Albums 176, and each of which is a container for an individual album, are positioned at the fourth level. A plurality of Tunes 178 are positioned at the fifth level that are content and are subordinate to each of the Individual Albums 177. In addition, a plurality of Individual Genres 180 that are subordinate to the Genres 179, and each of which is a container for an individual genre, are positioned at the fourth level. A plurality of Tunes 181 are positioned at the fifth level that are content and are subordinate to each of the Individual Genres 180. Additionally, a plurality of Tunes 183 are positioned at the fourth level that are content and are subordinate to the All 182. Note that the reference numerals that are used for the Individual Artists 174, the Individual Albums 177, the Individual Genres 180, and the Tunes 175 to 183 do not indicate the object IDs.

Containers and metadata records for single content files can also be allotted to positions that are subordinate to the Video 184, the Photos 185, and the user Files 186 in the same manner as the containers and metadata records that are subordinate to the Audio 172, although they are omitted from FIG. 8.

FIG. 9 is an explanatory figure that shows another example of a data arrangement in the hierarchically structured metadata. In the example shown in FIG. 9, a Root 187 is positioned at a first level, and containers such as a Music Jukebox 188, a Photo Albums 197, a Video Clips 198, an Applications and Services 199, and the like that are subordinate to the Root 187 are positioned at a second level.

Furthermore, containers such as an All 189, an Official Dates and Times 191, an Acquired Dates and Times 194, and the like that are subordinate to the Music Jukebox 188 are positioned at a third level. Additionally, a plurality of Tunes 190 are positioned at a fourth level that are content and are subordinate to the All 189.

Further, a plurality of Individual Official Dates and Times 192 that are subordinate to the Official Dates and Times 191, and each of which is a container for an individual official date and time, are positioned at the fourth level. A plurality of Tunes 193 are positioned at the fifth level that are content and are subordinate to each of the Individual Official Dates and Times 192. Additionally, a plurality of Individual Acquired Dates and Times 195 that are subordinate to the Acquired Dates and Times 194, and each of which is a container for an individual acquired date and time, are positioned at the fourth level. A plurality of Tunes 196 are positioned at the fifth level that are content and are subordinate to each of the Individual Acquired Dates and Times 195. Note that the reference numerals that are used for the Individual Official Dates and Times 192, the Individual Acquired Dates and Times 195, and the Tunes 190 to 196 do not indicate the object IDs.

Containers and metadata records for single content files can also be allotted to positions that are subordinate to the Photo Albums 197, the Video Clips 198, and the Applications and Services 199 in the same manner as the containers and metadata records that are subordinate to the Music Jukebox 188, although they are omitted from FIG. 9.

The structures of the media servers 12 have been described in detail above. As explained above, there are cases where the data arrangements in the hierarchical structures on the media servers 12 differ according to the individual media server 12. Therefore, if the user tries to use the client device 30 to search for the content on an individual media server 12, the user must determine what content search method to use based on an understanding of the hierarchical structures on the various media servers 12, which is cumbersome.

One of the aims of the data management system 10 according to the present embodiment is to address this problem. In the data management system 10 according to the present embodiment, providing the data management server 20 makes it possible to simplify the search operation by which the user searches for the content on the media server 12. The configuration of the data management server 20 will be explained in detail below with reference to FIGS. 10 to 18.

Figure 10:
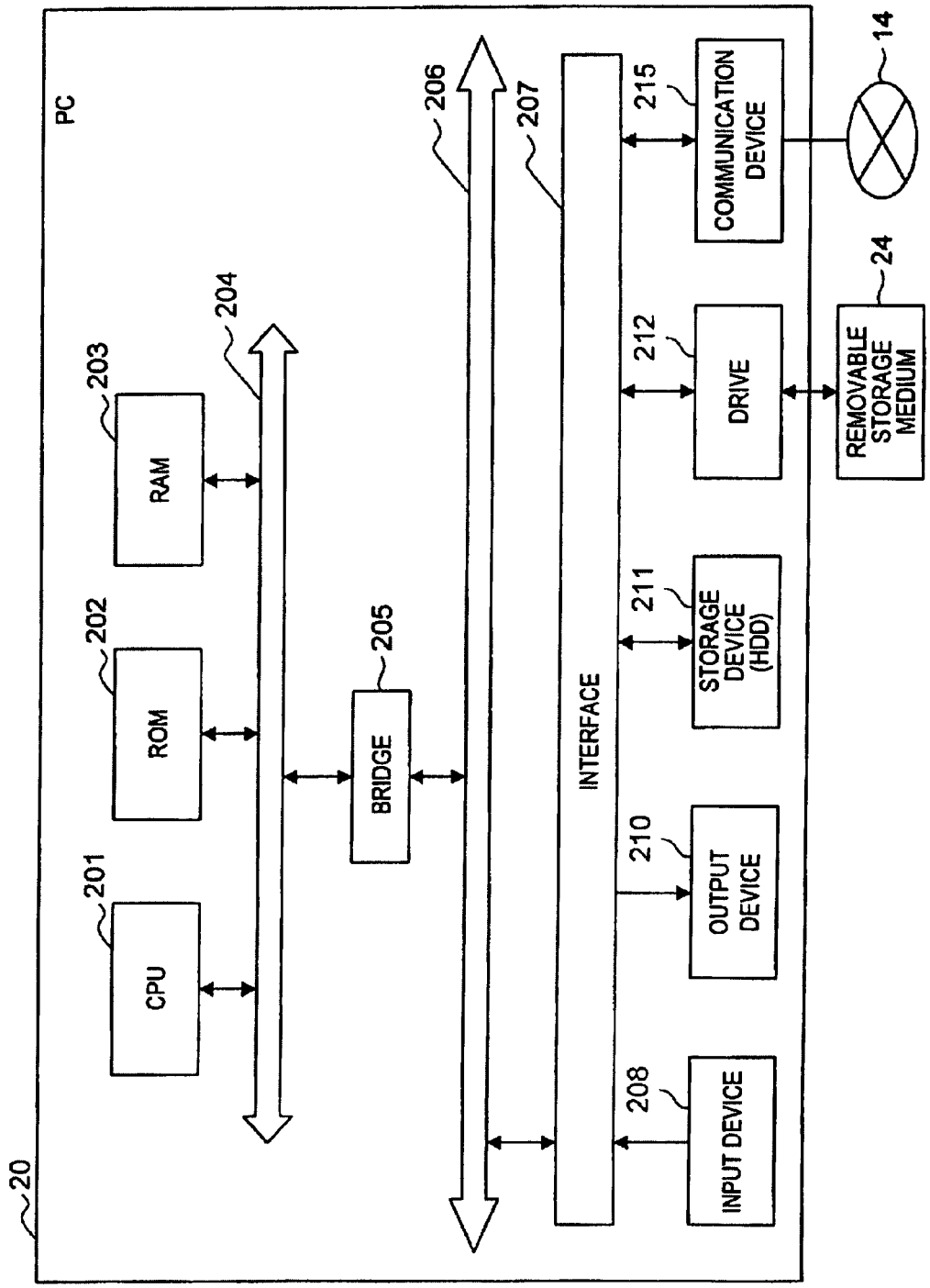
FIG. 10 is a block diagram that shows a hardware configuration of a data management server according to the first embodiment.

FIG. 10 is a block diagram that shows a hardware configuration of the data management server 20 according to the present embodiment. The data management server 20 is provided with a central processing unit (CPU) 201, a read-only memory (ROM) 202, a random-access memory (RAM) 203, a host bus 204, a bridge 205, an external bus 206, an interface 207, an input device 208, an output device 210, a storage device (HDD) 211, a drive 212, and a communication device 215.

The CPU 201 functions as a computational processing device and a control device and controls the overall operation of the data management server 20 in accordance with various types of programs. The CPU 201 may also be a microprocessor. The ROM 202 stores the programs the CPU 201 uses, computation parameters, and the like. The RAM 203 temporarily stores the programs that the CPU 201 uses in performing its functions, the parameters that change as necessary in the performance of the functions, and the like. The CPU 201, the ROM 202, and the RAM 203 are interconnected by the host bus 204, which is made up of a CPU bus and the like.

The host bus 204 is connected through the bridge 205 to the external bus 206, which is a Peripheral Component Interconnect/Interface (PCI) bus or the like.

The input device 208 includes an operation portion that the user operates, an input control circuit, and the like. The operation portion may be a mouse, a keyboard, a touch panel, a button, a switch, a lever, or the like, for example. The input control circuit generates an input signal based on the operation by the user and outputs the input signal to the CPU 201. The user of the data management server 20 uses the input device 208 to input various types of data to the data management server 20 and to command the processing operations of the data management server 20.

The output device 210 includes a display device and an audio output device. The display device may be a cathode ray tube (CRT) display device, a liquid crystal display (LCD) device, a lamp, or the like. The audio output device may be a speaker, a headphone, or the like. The output device 210 outputs, for example, the content that is played back. Specifically, the display device displays various types of information, such as the image data and the like that is played back, as text and images. In contrast, the audio output device converts in to sound the audio data and the like that is played back and outputs it.

The storage device 211 is a device for storing data that is configured as an example of a storage portion of the data management server 20 according to the present embodiment. The storage device 211 can include a storage medium, a recording device that records the data in the storage medium, a reading device that reads the data from the storage medium, a deleting device that deletes the data that is recorded in the storage medium, and the like. The storage device 211 may be made up of a hard disk drive (HDD), for example. The storage device 211 drives the hard disk and stores the programs that the CPU 201 executes and various types of data. The metadata, the thumbnails, the server information, and the like are also stored in the storage device 211.

The drive 212 is a reader-writer for the storage medium and can be built in to or attached externally to the data management server 20. The drive 212 reads information that is recorded in a removable storage medium 24, such as a magnetic disk, an optical disk, a magneto-optical disk, a semiconductor memory, or the like that is mounted in the drive 212 and outputs the information to the RAM 203.

The communication device 215 is a communication interface that is configured, for example, as a communication device or the like to be connected to the communication network 14. The communication device 215 may also be a communication device that is compatible with a wireless local area network (LAN), a communication device that is compatible with Wireless USB, or a wired communication device that performs communication using wires. The communication device 215 transmits and receives various types of data, such as the metadata, the thumbnails, the server information, and the like, between the media servers 12 and the client device 30, through a home network, for example.

Figure 11:
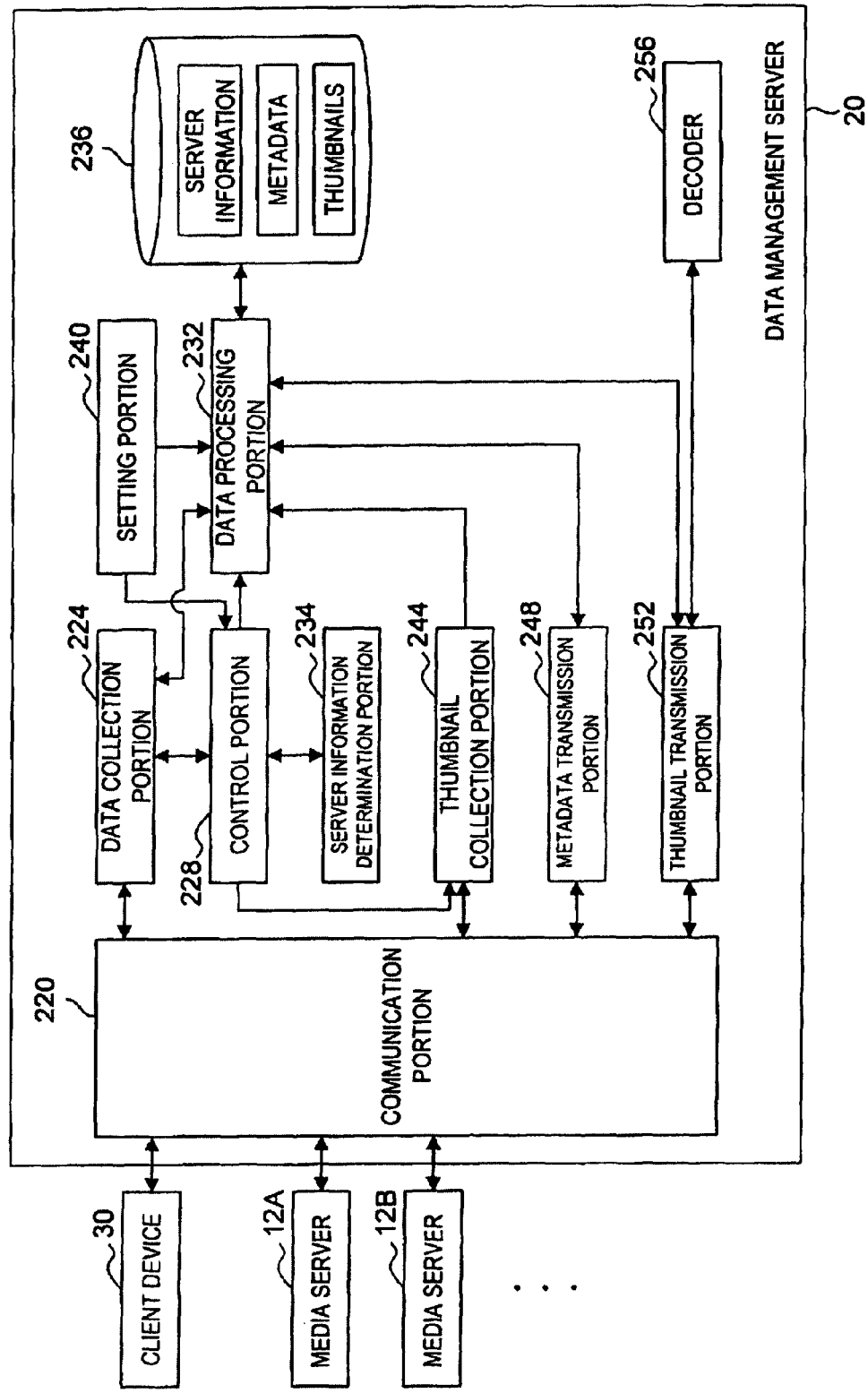
FIG. 11 is a functional block diagram that shows a configuration of the data management server according to the first embodiment.

FIG. 11 is a functional block diagram that shows a configuration of the data management server 20 according to the present embodiment. The data management server 20 is provided with a communication portion 220, a data collection portion 224, a control portion 228, a data processing portion 232, a server information determination portion 234 as a determination portion, a storage portion 236, a setting portion 240, a thumbnail collection portion 244, a metadata transmission portion 248, a thumbnail transmission portion 252, and a decoder 256.

The communication portion 220 is an interface with the media servers 12, the client device 30, and the like, and has the functions of a transmission portion and a receiving portion. For example, the communication portion 220 can receive the metadata, the thumbnails, the server information, and the like from the media servers 12 and transmit the metadata, the thumbnails, and the like to the client device 30. The communication portion 220 may be the communication device 215 that is shown in FIG. 10, and it may also be software, such as a communication program according to which the CPU 201 that is shown in FIG. 10 operates.

The data collection portion 224, based on control by the control portion 228, collects the metadata and the server information from each of the media servers 12. For example, the data collection portion 224 may be provided with the function of a digital media player that conforms to the DLNA guidelines and can detect the media servers 12 that are connected through a home network. It is possible for the data collection portion 224 to request the transmission of the server information from the detected media servers 12 and to collect the server information from the media servers 12.

Furthermore, when any of the media servers 12 changes from a stopped state to an operating state, and when any of the media servers 12 changes from an operating state to a stopped state, the data collection portion 224 can receive change information from the applicable media server 12 that indicates that the operational state of the media server 12 will change. The data processing portion 232 stores the server information that is collected by the data collection portion 224 in the storage portion 236 in association with the operational state. The server information that is stored in the storage portion 236 in association with the operational state will be explained below with reference to FIG. 12.

FIG. 12 is an explanatory figure that shows an example of the server information that is stored in the storage portion 236 in association with the operational state. The server information includes a server ID, a server name, an IP address, a UUID, update information, and an operational state. The server ID, the server name, the IP address, the UUID, and the update information are as was explained with reference to FIG. 4. The operational state is information that indicates whether the applicable media server 12 is operating or not.

For example, as shown in FIG. 12, the storage portion 236 stores a server information record in which the server ID is "001", the server name is "Server A", the IP address is "192.168.130.76", the UUID is "AF8CD239", the update information is "11", and the operational state is "Operating". As also shown in FIG. 12, the storage portion 236 stores a server information record in which the server ID is "002", the server name is "Server B", the IP address is "192.168.130.78", the UUID is "DDA8701B", the update information is "34", and the operational state is "Operating". In another example shown in FIG. 12, the storage portion 236 stores a server information record in which the server ID is "003", the server name is "Server C", the IP address is "192.168.130.84", the UUID is "CE4HDCA4", the update information is "56", and the operational state is "Stopped".

Returning to the explanation of the configuration of the data management server 20 with reference to FIG. 11, the data collection portion 224, based on control by the control portion 228, collects the metadata from each of the media servers 12. The metadata includes the location information that was explained with reference to FIG. 6 and the attribute information that was explained with reference to FIG. 7. Note that although the location information and the attribute information are divided between FIGS. 6 and 7 to make it easier to explain them, the location information and the attribute information may also be expressed in the form of a single table.

The control portion, 228 controls the collection of the server information and the metadata by the data collection portion 224 and the collection of the thumbnails by the thumbnail collection portion 244. For example, the timing at which the control portion 228 causes the data collection portion 224 to collect the server information may be when the data management server 20 starts operating, at a time interval (for example, once a minute or once every 30 minutes) based on a user setting, at a time (for example, 10:30) based on a user setting, or when the change information is received indicating that the media server 12 will change to the operating state. The control portion also determines whether or not the UUID that is contained in the server information that the data collection portion 224 collected is the UUID of an unknown media server 12. In a case where the UUID that is contained in the server information is the UUID of an unknown media server 12, the control portion 228 controls the data collection portion 224 such that the data collection portion 224 collects the metadata from the applicable media server 12.

On the other hand, in a case where the UUID that is contained in the server information is the UUID of a known media server 12, the control portion 228 controls the data collection portion 224 such that the data collection portion 224 collects the metadata from the applicable media server 12 based on whether or not there is a change in the IP address or the update information that is contained in the server information.

To provide a more detailed explanation, the control portion 228 can regulate the number of the metadata records that the data collection portion 224 collects per unit time. For example, when the data collection portion 224 has collected a specified number of the metadata records, the control portion 228 can suspend the collection of the metadata by the data collection portion 224 until a pre-set waiting time has elapsed. After the waiting time elapses, the control portion 228 can restart the collection of the specified number of the metadata records by the data collection portion 224.

If this configuration is used, the number of the metadata records that the data collection portion 224 collects per unit time can be limited by the setting of the waiting time. This makes it possible to reduce the processing load on the data management server 20 and the media servers 12.

Further, the setting portion 240 may be configured such that it can set the waiting time according to the processing load and/or the information processing capacity of the data management server 20 and/or the media servers 12. If this configuration is used, the setting portion 240 can lengthen the waiting time in a case where the information processing capacity of the data management server 20 is low or where the user is performing an operation on the data management server 20, thereby limiting the amount of processing that the data management server 20 devotes to the collection of the metadata. On the other hand, in a case where the information processing capacity of the data management server 20 is high or where the user is not performing an operation on the data management server 20, the setting portion 240 can shorten the waiting time or set the waiting time to zero in an attempt to make the collection of the metadata quicker.

Furthermore, in a case where the data collection portion 224 has collected from one media server 12 a plurality of the metadata records for the same content, the control portion 228 can cause the data processing portion 232 to use only one of the metadata records in the processing to create the hierarchical structure. Specifically, before a metadata record that carries a link ID is collected, the control portion 228 checks to see if the metadata record for which the link ID is the object ID has already been collected, and if it has already been collected, the metadata record that carries the link ID is not collected. Moreover, in a case where the metadata record for which the link ID is the object ID is collected after the metadata record that carries the link ID is collected, the control portion 228 can discard the metadata record that carries the link ID and cause the data processing portion 232 to use the metadata record for which the link ID is the object ID in the processing to create the hierarchical structure. The control portion 228 can also discard metadata that does not carry a content URL.

When the collection of the metadata from one media server 12 has been completed, the control portion 228 can also instruct the thumbnail collection portion 244 to start collecting the thumbnails from the same media server 12.

The data processing portion 232 performs the processing to write the server information, the metadata, and the thumbnails to the storage portion 236 and performs the processing to read the server information, the metadata, and the thumbnails from the storage portion 236.

More particularly, the data processing portion 232 structures the collected metadata hierarchically and stores it in the storage portion 236. At this time, the processing portion 232 structures the metadata hierarchically based on the attribute information, without referring to the location information that is contained in the metadata. A specific example of the metadata that is thus structured hierarchically based on the attribute information will be explained with reference to FIG. 13.

Figure 13:
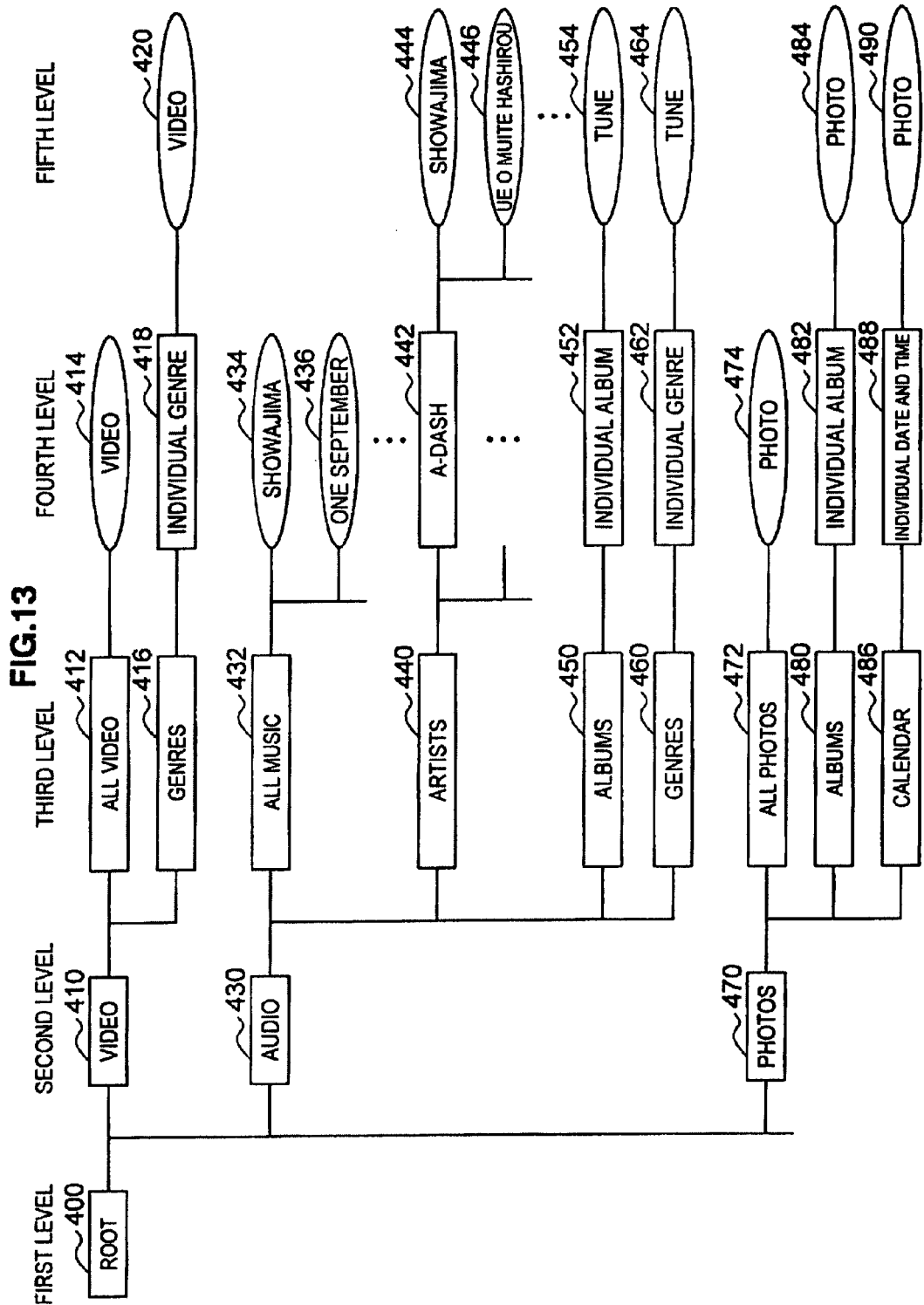
FIG. 13 is an explanatory figure that shows an example of the metadata that is hierarchically structured by a data processing portion.

FIG. 13 is an explanatory figure that shows an example of the metadata that is hierarchically structured by the data processing portion 232. FIG. 13 shows a case where the data management server 20 collected the metadata that is shown in FIGS. 6 and 7 from the media servers 12.

In the hierarchical structure example shown in FIG. 13, a Root 400 is positioned at a first level. Containers such as a Video 410, a Audio 430, a Photos 470, and the like that are subordinate to the Root 400 are positioned at a second level. An All Video 412 and a Genres 416 that are subordinate to the Video 410 are positioned at a third level. A Video 414 that is subordinate to the All Video 412 is positioned at a fourth level. An Individual Genre 418 that is subordinate to the Genres 416 is also positioned at the fourth level, and a Video 420 that is subordinate to the Individual Genre 418 is positioned at a fifth level. Note that in FIG. 13, a node that is shown as a rectangle is a container, and a node that is shown as an ellipse is a metadata record for a content file. That is, the Video 410 indicates that the metadata for video content is subordinate to the Video 410, and the Video 414 indicates the video content metadata record itself.

A plurality of containers that are subordinate to the Audio 430 are also positioned at the third level. Specifically, an All Music 432, an Artists 440, an Albums 450, and a Genres 460 that are subordinate to the Audio 430 are positioned at the third level. Here, the data processing portion 232 refers to the media class in the attribute information shown in FIG. 7 that was collected from the media servers 12 for "Showajima", "One September", and "Ue o Muite Hashirou". The data processing portion 232 confirms that the media class is "Audio", then allots the metadata for "Showajima", "One September", and "Ue o Muite Hashirou" to the fourth level, subordinate to the All Music 432. In FIG. 13, the Showajima 434 and the One September 436 are shown as positioned at the fourth level, subordinate to the All Music 432, as an example.

The data processing portion 232 also refers to the artist in the attribute information shown in FIG. 7 that was collected from the media servers 12 for "Showajima", "One September", and "Ue o Muite Hashirou". The data processing portion 232 confirms that the artists are "A-DASH" and "Mint", then allots containers for "A-DASH" and "Mint" at the fourth level, subordinate to the Artists 440. In FIG. 13, the A-DASH 442 is shown as positioned at the fourth level, subordinate to the Artists 440, as an example. The data processing portion 232 also refers to the artist in the metadata for "Showajima" and "Ue o Muite Hashirou". The data processing portion 232 confirms that the artist for "Showajima" and "Ue o Muite Hashirou" is "A-DASH", then allots the metadata for "Showajima" and "Ue o Muite Hashirou" to the fifth level, subordinate to the A-DASH 442. In FIG. 13, the Showajima 444 and the Ue o Muite Hashirou 446 are shown as positioned at the fifth level, subordinate to the A-DASH 442, as an example.

An Individual Album 452 is also positioned at the fourth level, subordinate to the Albums 450. Note that the Individual Album 452 includes the album names "Elevator", "Season", and the like that are included in the attribute information that is shown in FIG. 7. Also, a Tune 454 is positioned at the fifth level, subordinate to the Individual Album 452.

An Individual Genre 462 is also positioned at the fourth level, subordinate to the Genres 460. Note that the Individual Genre 462 includes the genre names "Pop", "Rock", and the like that are included in the attribute information that is shown in FIG. 7. Also, a Tune 464 is positioned at the fifth level, subordinate to the Individual Genre 462.

An All Photos 472, an Albums 480, and a Calendar 486 that are subordinate to the Photos 470 are also positioned at the third level. A Photo 474 is also positioned at the fourth level, subordinate to the All Photos 472. An Individual Album 482 is also positioned at the fourth level, subordinate to the Albums 480, and a Photo 484 is also positioned at the fifth level, subordinate to the Individual Album 482. An Individual Date and Time 488 is also positioned at the fourth level, subordinate to the Calendar 486, and a Photo 490 is also positioned at the fifth level, subordinate to the Individual Date and Time 488.

As described above, the data processing portion 232 can structure the metadata hierarchically, based on the attribute information that is contained in the collected metadata. That is, the data processing portion 232 refers to the attribute information that is contained in the metadata to determine to which nodes that are subordinate to which containers the metadata will be allotted. The data processing portion 232 then associates the metadata with the object IDs of the nodes to which the metadata is allotted. Therefore, the client device 30 can search for the content without knowing on which of the media servers 12 the content is stored.

Note that in the explanation above, a case was explained where the data processing portion 232 structures the metadata hierarchically before writing the metadata to the storage portion 236, but the data processing portion 232 may also hierarchically structure the metadata that is stored in the storage portion 236.

If this configuration is used, the data management server 20 can hierarchically structure the metadata that is stored in the storage portion 236 when a metadata transmission request is received from the client device 30, for example. That is, having the data processing portion 232 perform the hierarchical structuring processing only when a metadata transmission request is received from the client device 30 makes it possible to limit the processing load on the data management server 20 for performing the hierarchical structuring processing, even in a case where the content that is stored on the media servers 12 is updated frequently.

FIG. 14 is an explanatory figure that shows an example of the attribute information in the hierarchically structured metadata on the data management server 20. The data processing portion 232 changes the object IDs that are contained in the metadata shown in FIG. 7 to the object IDs of the nodes on the data management server 20 to which the metadata records are allotted, as shown in FIG. 14. Specifically, the data processing portion 232 associates the object IDs 434 and 444 with "Showajima", associates the object ID 436 with "One September", and associates the object ID 446 with "Ue o Muite Hashirou".

The data processing portion 232 also writes to the storage portion 236 the thumbnails that are collected by the thumbnail collection portion 244. The data processing portion 232 also changes or updates the thumbnail URLs that are contained in the metadata records that are associated with the thumbnails that are written to the storage portion 236. That is, at the point in time when the data collection portion 224 collects the metadata from the media servers 12, the thumbnail URLs indicate the locations of the thumbnails on the media servers 12. The data processing portion 232, when it stores the thumbnails in the storage portion 236, can change the thumbnail URLs to indicate the locations of the thumbnails in the storage portion 236.

FIG. 15 is an explanatory figure that shows the metadata in which the thumbnail URLs have been updated by the data processing portion 232. The metadata location information that is shown in FIG. 15 includes the content ID, the object ID, the link ID, the parent ID, the child ID, the content URL, the thumbnail URL, and the server UUID. In each of the metadata records, the object ID, the link ID, and the parent ID are IDs that are assigned according to the nodes to which each of the metadata records is allotted, as shown in FIG. 13. For example, "Showajima", with the content ID "1001", is associated with the object IDs "434" and "444". The "Showajima" with the object ID "434" has the parent ID "432", because its higher-level node is the All Music 432.

The content URL, as described above, is content location information that indicates the location of the content. The content URL indicates on which of the media servers 12 the content is located. A portion of the content URL also includes the IP address of the applicable media server 12.

The thumbnail URL is thumbnail location information that indicates the location of the thumbnail. In FIG. 6, the thumbnail URL indicates the location of the thumbnail on the media server 12. However, after the thumbnail is stored in the storage portion 236 of the data management server 20, the data processing portion 232 can rewrite the thumbnail URL such that the thumbnail URL indicates the location of the thumbnail in the storage portion 236 of the data management server 20, as shown in FIG. 15.

The server UUID is information that indicates from which of the media servers 12 each of the metadata records was collected. Therefore, the UUIDs "AF8CD239" in all of the metadata records shown in FIG. 15 mean that all of the metadata records were collected from the media server 12 for which the UUID is "AF8CD239".

Thus the data processing portion 232 according to the present embodiment can update the thumbnail URLs that are contained in the metadata and that correspond to the thumbnails that are stored in the storage portion 236, such that the thumbnail URLs indicate the locations of the thumbnails in the storage portion 236. In the present embodiment, the client device 30 acquires the thumbnails based on the thumbnail URLs that are contained in the metadata that is acquired from the data management server 20. Therefore, if the thumbnail URLs that are contained in the metadata indicated locations on the media servers 12, the client device 30 would have to access the media servers 12 to acquire the thumbnails. However, in that case, if the applicable media server 12 is not in operation, the client device 30 cannot acquire the thumbnails unless it purposely starts up the media server 12. Thus, updating the thumbnails URLs that are contained in the metadata such that they indicate locations on the data management server 20, as described above, makes it possible for the client device 30 to acquire the thumbnails from the data management server 20, regardless of the operational state of the media server 12.

Further, the data processing portion 232, in a case where the IP address of the applicable media server 12 has changed, can update the content URLs that are contained in the metadata, based on the determination of the server information determination portion 234. More particularly, the IP address of the media server 12 where the content is stored is included as a part of the content URL. Accordingly, the server information determination portion 234 determines whether or not the IP address of the media server 12 has changed. In a case where the server information determination portion 234 determines that the IP address of the media server 12 has changed, the data processing portion 232 can provisionally rewrite the IP address that is contained in the content URLs to the changed IP address of the media server 12.

For example, consider a case where the server information that is shown in FIG. 12 is stored in the storage portion 236 and the data management server 20 receives new server information in which the UUID is "AF8CD239" and the IP address is "192.168.130.104". In this case, the server information determination portion 234 refers to the server information that is stored in the storage portion 236 and confirms that for the media server 12 with the UUID "AF8CD239", the IP address is "192.168.130.76". Note that in FIG. 11, the server information determination portion 234 is shown such that it acquires the server information through the data processing portion 232, but a read-write portion may be provided separately from the data processing portion 232, and the server information determination portion 234 may acquire the server information through the read-write portion. Next, the server information determination portion 234 compares the IP address "192.168.130.104" that is contained in the new server information to the IP address "192.168.130.76" that is contained in the server information that is stored in the storage portion 236. Because the two IP addresses are different, the server information determination portion 234 determines that the IP address of the media server 12 has changed.

Next, the data processing portion 232 can receive the determination by the server information determination portion 234 and, as shown in FIG. 16, change the IP address parts of the content URLs that are contained in the metadata with the server UUID "AF8CD239" from "192.168.130.76" to "192.168.130.104", the IP address that is contained in the new server information.

In this manner, the data management server 20 updates the content URLs that are contained in the metadata in a case where the IP address of the media server 12 has changed. Therefore, the data management server 20 can provisionally update the IP address parts that are included in the content URLs, and provide the applicable metadata to the client device 30, even before collecting the metadata again from the applicable media server 12.

However, in a case where the IP address of the media server 12 has changed, there is a possibility that information other than the IP address part of the content URL has also changed. Accordingly, in a case where the IP address of the media server 12 has changed, the control portion 228 can cause the data collection portion 224 to collect the metadata again from the media server 12 after the IP address parts that are included in the content URLs have been provisionally updated.

Note that a change to the IP address of the media server 12, as described above, occurs mainly in the two situations described below. The first conceivable situation is where the IP address is changed by a DHCP server. In a case where the IP address of the media server 12 is set automatically by a DHCP server, it is possible for the DHCP server both to allot the IP address to the media server 12 automatically and to change the IP address of the media server 12 automatically. Therefore, in a case where the media server 12 is connected to a network in which a DHCP server is operating as described above, the possibility exists that the IP address of the media server 12 will be changed by the DHCP server.

The second conceivable situation is where the IP address is changed by a user. In a case where the IP address of the media server 12 is registered by a user, the possibility exists that the user will change the IP address of the media server 12 for some reason, such as a change in the network environment settings or the like.

Returning to the explanation of the server information determination portion 234, the server information determination portion 234 determines whether or not the content that is stored on the media server 12 has been updated, based on the new server information for the media server 12 that was collected by the data collection portion 224. More particularly, the server information determination portion 234 compares the update information that is contained in the new server information to the update information that is contained in the server information that is stored in the storage portion 236. If the update information differs, the server information determination portion 234 determines that the content that is stored on the media server 12 has been updated.

The control portion 228 can cause the data collection portion 224 to collect the metadata again from the media server 12, based on the determination by the server information determination portion 234 that the media server 12 has been updated.

Returning to the explanation of the configuration of the data management server 20 according to the present embodiment, the storage portion 236 stores the server information, the metadata, and the thumbnails. The storage portion 236 may be the storage device 211 that is shown in FIG. 10, and it may also be a storage medium such as a non-volatile memory such as an electrically erasable programmable read-only memory (EEPROM), an erasable programmable read-only memory (EPROM), or the like, a magnetic disk such as a hard disk, a floppy® disk, or the like, an optical disk such as a compact disc recordable (CD-R), a compact disc rewritable (CD-RW), a digital versatile disc recordable (DVD-R), a digital versatile disc rewritable (DVD-RW), a dual-layer digital versatile disc recordable (DVD+R), a dual-layer digital versatile disc rewritable (DVD+RW), a digital versatile disc random access memory (DVD-RAM), a Blu-ray™ disc recordable (BD-R), a dual-layer Blu-ray™ disc recordable (BD-RE), or the like, or a magneto-optical (MO) disk or the like.

The setting portion 240 makes various settings in the data management server 20. For example, based on a user operation, the setting portion 240 can set the media servers 12 that will be the objects of the metadata collection. The metadata for the content that is stored on the media servers 12 that will not be the objects of the metadata collection may be deleted from the storage portion 236. The control portion 228 can cause the data collection portion 224 to collect the metadata only from the media servers 12 that are set by the setting portion 240 as the objects of the metadata collection.

The thumbnail collection portion 244 collects the thumbnails from the media servers 12 according to thumbnail collection instructions from the control portion 228. More particularly, the thumbnail collection portion 244 collects the thumbnails from the locations that are indicated by the thumbnail URLs, based on the thumbnail URLs that are contained in the collected metadata.

Note that in a case where the thumbnails do not exist for photo content, the data management server 20 may acquire the photo content itself based on the content URLs that are contained in the metadata, change the size of the photo content, to 160 by 160 bytes, for example, and store the re-sized photo content as thumbnails in the storage portion 236.

The metadata transmission portion 248, when the metadata transmission request is received from the client device 30, extracts the metadata from the storage portion 236 and transmits it to the client device 30. The metadata transmission portion 248 may also be configured such that it has the functions of a digital media server that conforms to the DLNA guidelines.

The thumbnail transmission portion 252 transmits to the client device 30 by a streaming method the thumbnails that correspond to the metadata that the metadata transmission portion 248 transmits to the client device 30. More particularly, the client device 30, based on the thumbnail URLs that are contained in the received metadata, requests the transmission of the thumbnails from the data management server 20. The thumbnail transmission portion 252 receives the thumbnail transmission request and transmits the thumbnails to the client device 30. In the present embodiment, the streaming method is a method for transmitting the thumbnails in synchronization with the thumbnail processing speed of the client device 30.

The decoder 256 converts, as necessary, the data format of the thumbnails that the thumbnail transmission portion 252 transmits to the client device 30. For example, in a case where the data format of the thumbnails that the thumbnail transmission portion 252 transmits to the client device 30 is a data format that is not compatible with the client device 30, the decoder 256 functions as a conversion portion that converts the thumbnails to a data format that is compatible with the client device 30.

The configuration of the data management server 20 has been explained in detail above. Note that it is possible to achieve functions equivalent to those of the configurations described above in hardware such as the CPU 201, the ROM 202, and the RAM 203 shown in FIG. 10 and the like, based on a computer program that causes a computer to perform the operations of the data collection portion 224, the control portion 228, the data processing portion 232, the server information determination portion 234, the setting portion 240, the thumbnail collection portion 244, the metadata transmission portion 248, the thumbnail transmission portion 252, and the decoder 256.

Next, a data management method in the data management server 20 according to the present embodiment will be explained with reference to FIGS. 17 and 18.

Figure 17:
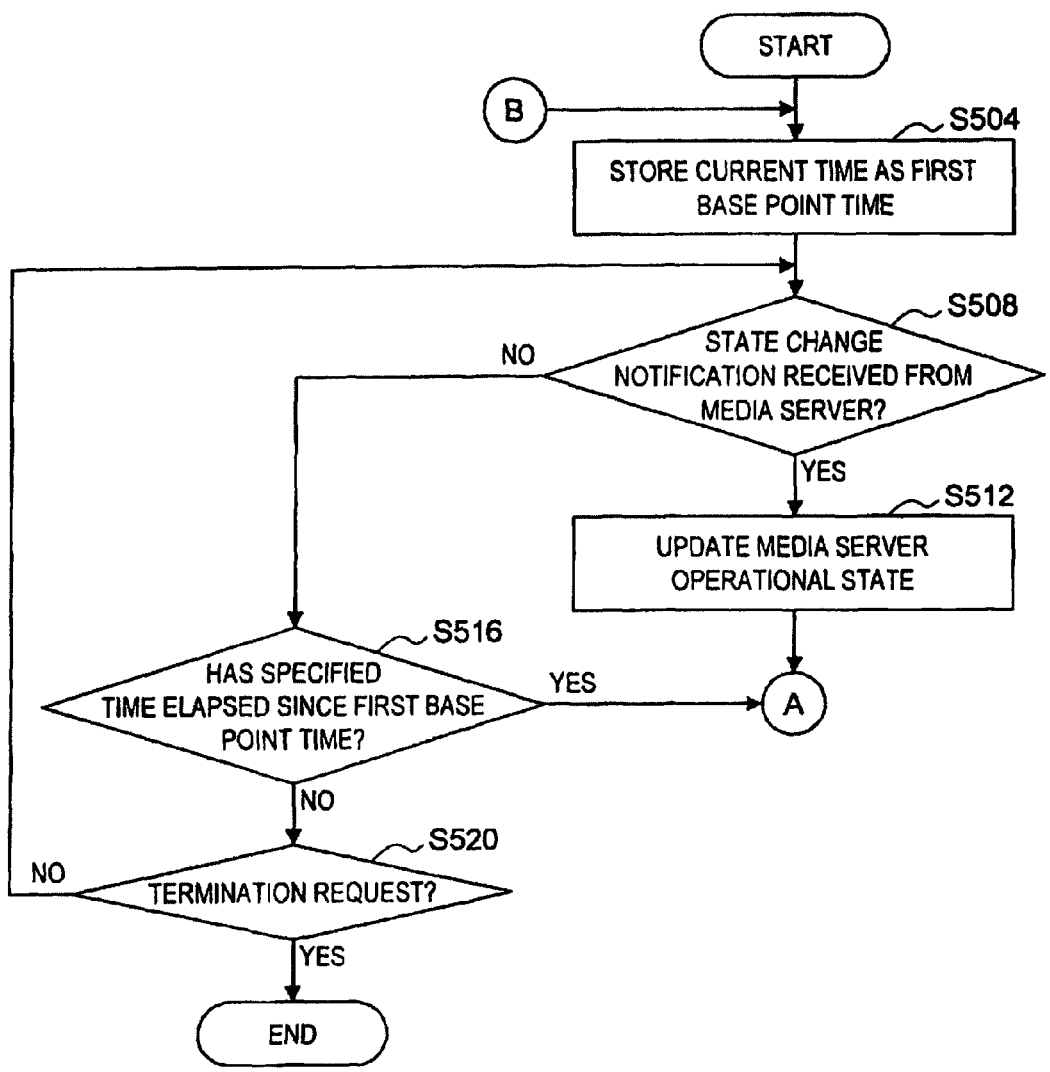
FIG. 17 is a flow chart that shows a data management method in the data management server according to the first embodiment.
Figure 18:
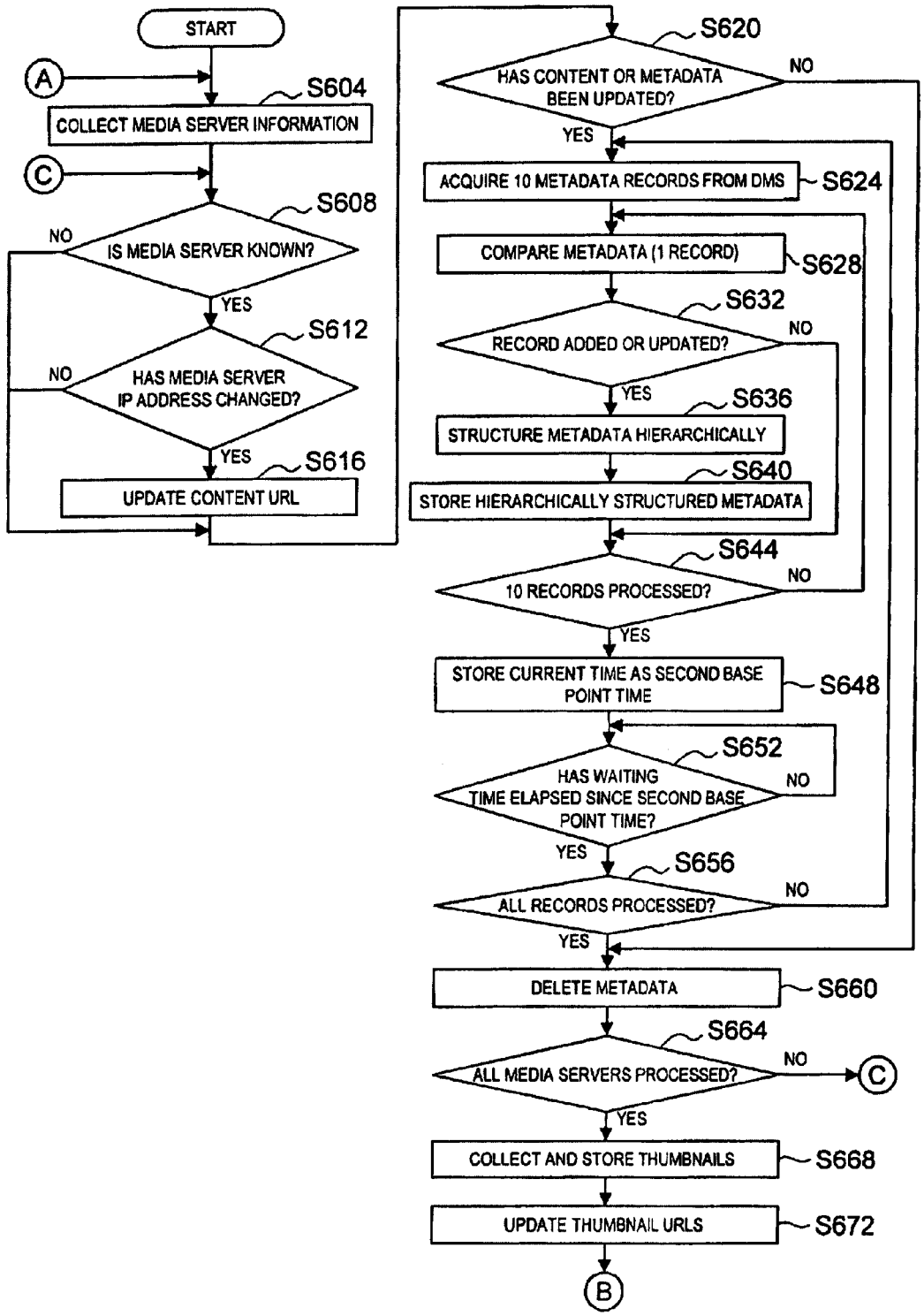
FIG. 18 is a flow chart that shows the data management method in the data management server according to the first embodiment.

FIGS. 17 and 18 are flow charts that show the data management method in the data management server according to the present embodiment. Referring to FIGS. 17 and 18, the data management server 20 first stores the current time as a first base point time (Step S504). Next, the data management server 20 determines whether or not it has received a state change notification as the operational state change information from the media server 12 (Step S508). In a case where the data, management server 20 determines that it has received the state change notification, the data processing portion 232 updates the operational state that is contained in the server information that is stored in the storage portion 236 (Step S512). Then the processing proceeds to Step S604 that is shown in FIG. 18.

In a case where the data management server 20 determines at Step S508 that it has not received the state change notification, the control portion 228 determines whether or not a specified time has elapsed since the first base point time that was stored at Step S504 (Step S516). In a case where the control portion 228 determines that the specified time has elapsed since the first base point time, the processing proceeds to Step S604 that is shown in FIG. 18. In a case where the control portion 228 determines that the specified time has not elapsed since the first base point time, the control portion 228 determines whether or not a termination request exists (Step S520). In a case where the control portion 228 determines that the termination request does exist, the processing terminates. In a case where the control portion 228 determines that the termination request does not exist, the processing returns to Step S508.

Next, referring to FIG. 18, the data collection portion 224, based on the control of the control portion 228, collects the server information from the media servers that are connected to the home network and stores the server information in the storage portion 236 (Step S604). Here, the media servers 12 can be differentiated according to whether Step S604 is performed after Step S512 or after Step S516. For example, in a case where Step S604 is performed after Step S512, the server information may be collected only from the media servers 12 that transmitted the state change notifications. In a case where Step S604 is performed after Step S516, the server information may be collected from all of the media servers 12 that are connected to the home network.

Next, the data management server 20 determines whether or not the media server 12 is known, based on the server information that the data collection portion 224 collected from the media server 12 (Step S608). Where the data management server 20 determines that the media server 12 is known, the server information determination portion 234 determines whether or not the IP address of the media server 12 has been updated, based on the server information (Step S612). In a case where the server information determination portion 234 determines that the IP address of the media server 12 has been updated, the data processing portion 232 changes the IP address part of the content URL that is contained in the metadata that is stored in the storage portion 236 to the new IP address of the media server 12 (Step S616).

After Step S616, after the data management server 20 determines at Step 612 that the IP address of the media server 12 has not been updated, and after the data management server 20 determines at Step 608 that the media server 12 is not known, the server information determination portion 234 determines whether or not the content or the metadata that is stored on the media server 12 has been updated, based on the update information that is contained in the server information (Step S620). In a case where the server information determination portion 234 determines that the content or the metadata that is stored on the media server 12 has been updated, the data collection portion 224, based on the control of the control portion 228, collects ten metadata records as a unit quantity from the media server 12 (Step S624).

Next, the control portion 228 compares the metadata that was collected at Step S624 to the metadata that is stored in the storage portion 236, one record at a time (Step S628). The control portion 228 then determines whether or not the metadata record has been updated or a new metadata record has been added (Step S632). Next, the data processing portion 232 hierarchically structures the metadata that the control portion 228 has determined was updated or added (Step S636). The door 232 then stores the hierarchically structured metadata in the storage portion 236 (Step S640).

Next, the control portion 228 determines whether or not it has performed the metadata comparison for all ten of the metadata records (Step S644). Where the metadata comparison has not been performed for all ten of the metadata records, the control portion 228 returns to the processing at Step S628. On the other hand, where the control portion 228 has performed the metadata comparison or all ten of the metadata records, the data management server 20 stores the current time as a second base point time (Step S648). Next, the data management server 20 determines whether or not a specified waiting time has elapsed since the second base point time (Step S652). After the specified waiting time has elapsed since the second base point time, the control portion 228 determines whether or not all of the metadata records that are stored on one of the media servers 12 have been collected (Step S656).

Where the control portion 228 determines at Step S656 that not all of the metadata records that are stored on the one media server 12 have been collected, the control portion 228 repeats the processing that starts at Step S624. On the other hand, where the control portion 228 determines at Step S656 that all of the metadata records that are stored on the one media server 12 have been collected, the data processing portion 232 deletes from the storage portion 236 the metadata that pertains to the content that was formerly stored on the one media server 12, but that has now been deleted (Step S660).

After the processing at Step S660, the control portion 228 determines whether or not the metadata has been collected from all of the media servers 12 that are the objects of collection (Step S664). In a case where the metadata has not been collected from all of the media servers 12 that are the objects of collection, the data management server 20 repeats the processing that starts at Step S608.

On the other hand, in a case where the control portion 228 determines that the metadata has been collected from all of the media servers 12 that are the objects of collection, the data collection portion 224, based on the control of the control portion 228, sequentially collects the thumbnails from the media servers 12, and the data processing portion 232 stores the collected thumbnails in the storage portion 236 (Step S668). The data processing portion 232 then updates, in the metadata, the thumbnail URLs for the thumbnails that are stored in the storage portion 236 (Step S672). Then the data management server 20 performs the processing a Step S504 that is shown in FIG. 17.

The configuration and the operation of the data management server 20 according to the present embodiment have been explained above. Next, the configuration of the client device 30 will be explained with reference to FIG. 19. That the hardware configuration of the client device 30 is substantially the same as the hardware configuration of data management server 20 that was explained with reference to FIG. 10, so an explanation of the hardware configuration will be omitted.

Figure 19:
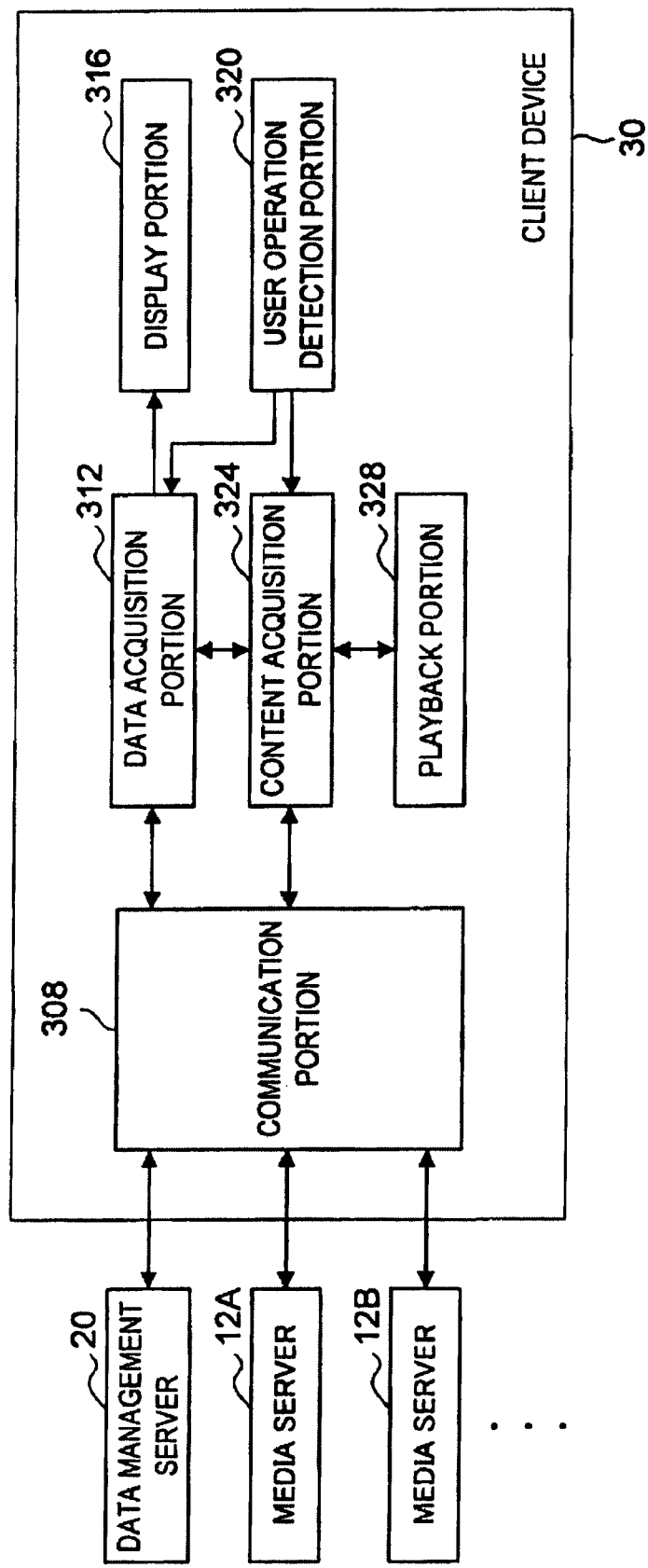
FIG. 19 is a functional block diagram that shows a configuration of a client device according to the first embodiment.

FIG. 19 is a functional block diagram that shows the configuration of the client device 30 according to the present embodiment. The client device 30 is provided with a communication portion 308, a data acquisition portion 312, a display portion 316, a user operation detection portion 320, a content acquisition portion 324, and a playback portion 328.

The communication portion 308 is an interface with a media servers 12, the data management server 20, and the like and has the functions of a transmission portion and a receiving portion. For example, the communication portion 308 can receive the metadata and the thumbnails from the data management server 20 and can receive the content from the media servers 12.

The data acquisition portion 312 acquires the hierarchically structured metadata from the media server 20 based on a user operation. For example, in a case where the user selects the Audio 430 that is shown in FIG. 13, the data acquisition portion 312 may be made to acquire the metadata that is associated with the containers at the third level that are subordinate to the Audio 430 and, such as the All Music 432, the Artists 440, the Albums 450, the Genres 460, and the like. The data acquisition portion 312 can also acquire the thumbnails from the data management server 20 based on the thumbnail URLs that are contained in the acquired metadata.

The display portion 316 is a display that displays the metadata and the thumbnails that the data acquisition portion 312 has acquired. The user can search for the desired content based on the content metadata and the thumbnails that are displayed by the display portion 316.

The user operation detection portion 320 detects such things as a user operation that instructs the client device 30 to acquire the metadata and a user operation that instructs the client device 30 to acquire the content, then outputs the instructions to the data acquisition portion 312 and the content acquisition portion 324.

The content acquisition portion 324 acquires the content from the media servers 12 based on the content acquisition instructions from the user operation detection portion 320. Specifically, the content acquisition portion 324 can acquire the content by referring to the content URL that is contained in the metadata for the content specified by the content acquisition instructions, then accessing the location indicated by the content URL.

The playback portion 328 can play back the content that the content acquisition portion 324 has acquired. If the content is in a digital format, the playback may include processing that converts the content from digital to analog format, then transmits it to an output device such as a display, a speaker, or the like. If the content is in an analog format, the playback may include processing that transmits the content data to an output device.

Thus the client device 30 according to the present embodiment can acquire the metadata and the thumbnails for the content that is stored on a plurality of the media servers 12 and acquire the content from the media servers 12 based on the metadata. Note that in a case where the desired media server 12 is in a stopped state, it is possible for the client device 30 to start the media server 12 by transmitting a start command to the media server 12.

As described above, in the data management system 10 according to the first embodiment of the present invention, the data management server 20 manages, in an integrated manner, the metadata for the content that is stored on a plurality of the media servers 12. Therefore, the client device 30 can search for the content that is stored on the plurality of the media servers 12 simply by accessing the data management server 20. Moreover, the data processing portion 23 of the data management server 20 structures the metadata hierarchically, based on the attribute information, so the client device 30 can search for the content without knowing on which of the media servers 12 the content is stored. That is, the data management server 20 can make it possible for the client device 30 to search for the content without tracing it back through a different directory structure for each of the media servers 12.

Furthermore, when the data management server 20 according to the present embodiment collects the thumbnails from the media servers 12, the data management server 20 can change the thumbnail URLs that are contained in the metadata to indicate the locations on the data management server 20. Therefore, it is possible for the client device 30 to acquire the thumbnail data from the data management server 20 regardless of the operational state of the media server 12.

In a case where the server information determination portion 234 determines that the IP address of the media server 12 has been changed, the data processing portion 232 of the data management server 20 according to the present embodiment can change the IP address part of the content URL that is contained in the metadata that is stored in the storage portion 236 to the IP address that is contained in the new server information. Therefore, in a case where the IP address of the media server 12 has been changed, the data management server 20 can provisionally update the content URL that is contained in the metadata and provide the metadata to the client device 30, even before collecting the metadata from the media server 12 again.

The server information determination portion 234 of the data management server 20 according to the present embodiment can determine whether or not the content that is stored on the media server 12 has been updated, based on the update information that is contained in the server information. That is, the server information determination portion 234 can determine whether or not the media server 12 has been updated, based simply on the update information, without checking all of the contents of the metadata that is stored on the media server 12.

The control portion 228 of the data management server 20 according to the present embodiment, by setting a specified waiting time, can limit the number of the metadata records that it causes the data collection portion 224 to collect per unit time. Thus the processing loads for the data management server 20 and the media servers 12 can be reduced.

The setting portion 240 of the data management server 20 according to the present embodiment can set the waiting time for the data management server 20 and/or the media servers 12 according to their processing loads and/or information processing capacities. Therefore, in a case where the information processing capacity of the data management server 20 is low, or where the user is performing an operation on the data management server 20, the setting portion 240 can make the waiting time longer, thereby limiting the amount of processing that the data management server 20 devotes to the collection of the metadata.

Second Embodiment

Next, a data management system 40 according to a second embodiment of the present invention will be explained. The data management system 10 according to the first embodiment simplifies the content search operation by the client device 30. However, there are cases where, if the data format of the content that is stored on the media servers 12 is not a standard data format that is compatible with the client device 30, the content cannot be played back on the client device 30. The data management system 40 according to the second embodiment of the present invention takes this problem in to consideration. The configuration and operation of the data management system 40 according to the present embodiment will be explained below with reference to FIGS. 20 to 22. Note that structural elements that have substantially the same function and structure as in the first embodiment are denoted with the same reference numerals, and repeated explanation of these structural elements is omitted.

Figure 20:
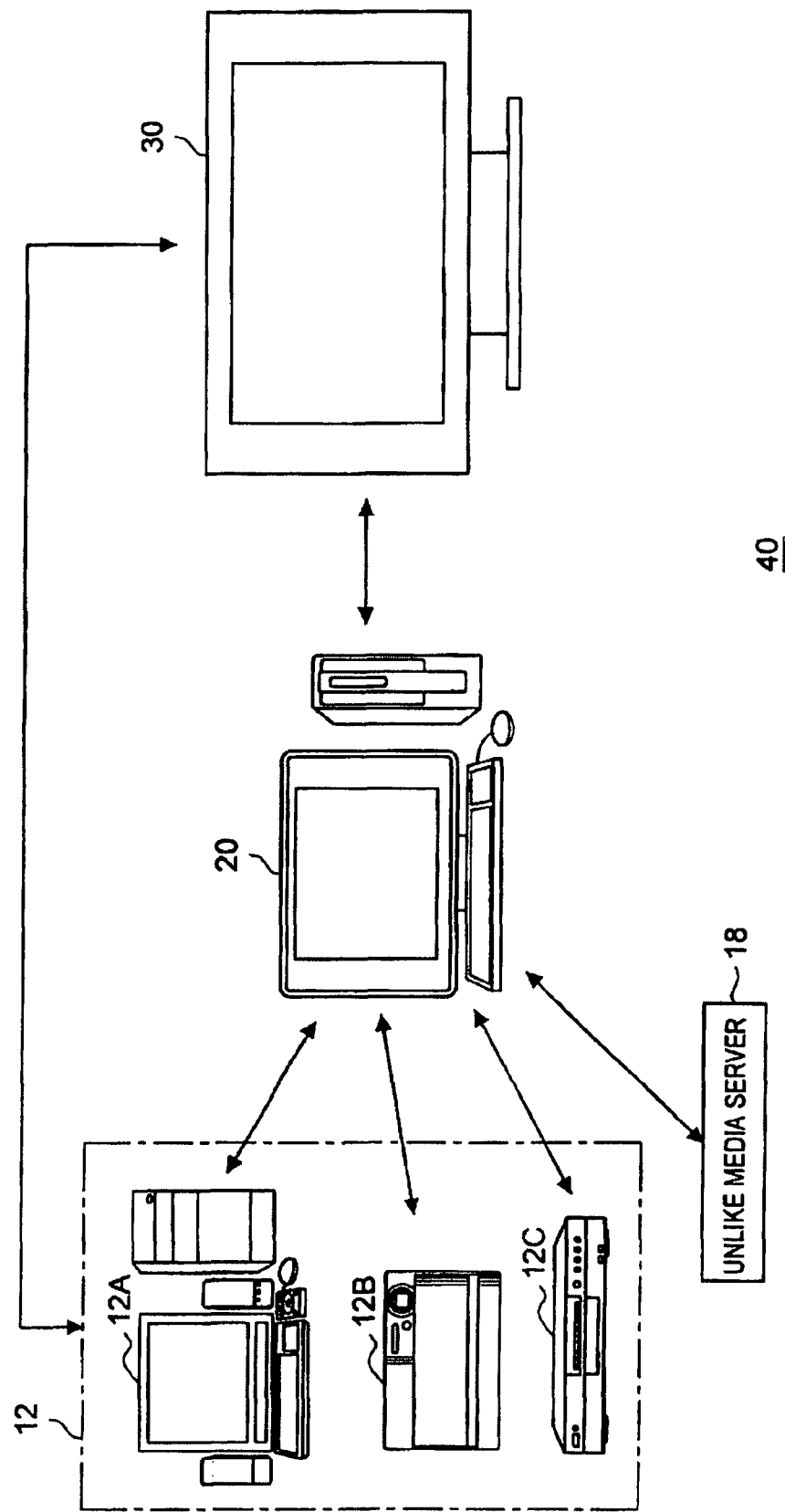
FIG. 20 is an explanatory figure that shows a configuration of a data management system according to a second embodiment of the present invention.

FIG. 20 is an explanatory figure that shows the configuration of the data management system 40 according to the present embodiment. The data management system 40 according to the present embodiment differs from the first embodiment in that it includes an unlike media server 18. The unlike media server 18 is the same as the media server 12 in that it stores the content and the metadata, and it has the functions of the media server 12, but it differs from the media server 12 in that the data format of the data it stores does not qualify as a standard data format in the data management system 40.

For example, if, except for the unlike media server 18, the data management system 40 conforms to the DLNA guidelines, the content that is in data formats such as MPEG2, JPEG, LPCM, MP3, and the like can be mutually communicated without any trouble. However, the possibility exists that the client device 30 will not be able to handle the content that is in data formats that are not prescribed by the DLNA guidelines, such as AAC, WMA, and the like.

A data management server 20 according to the present embodiment makes it possible for the client device 30 to play back the content whose data format does not qualify as a standard format for the data management system 40. The configuration of the data management server 20 according to the present embodiment will be explained below with reference to FIG. 21.

Figure 21:
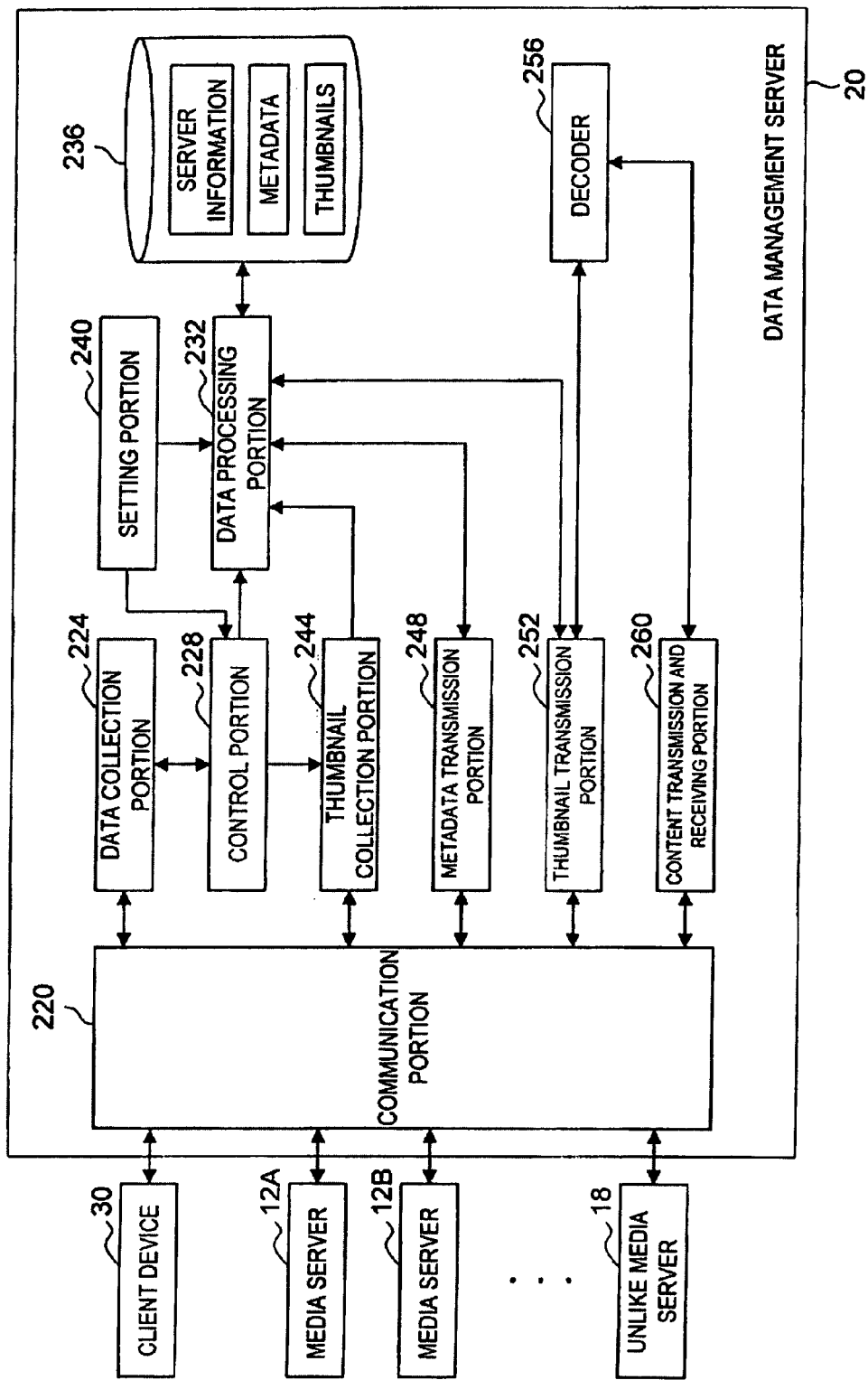
FIG. 21 is a functional block diagram that shows a configuration of a data management server according to the second embodiment.

FIG. 21 is a functional block diagram that shows the configuration of the data management server 20 according to the present embodiment. The data management server 20 according to the present embodiment is provided with a communication portion 220, a data collection portion 224, a control portion 228, a data processing portion 232, a server information determination portion, a storage portion 236, a setting portion 240, a thumbnail collection portion 244, a metadata transmission portion 248, a thumbnail transmission portion 252, a decoder 256, and a content transmission and receiving portion 260.

The configurations and operations of the communication portion 220, the data collection portion 224, the control portion 228, the data processing portion 232, the server information determination portion, the storage portion 236, the setting portion 240, the thumbnail collection portion 244, the metadata transmission portion 248, and the thumbnail transmission portion 252 are substantially the same as what was explained for the first embodiment, so the explanation of these elements is omitted.

When the content transmission and receiving portion 260 receives from the client device 30 a request to transmit the content that is stored on the unlike media server 18 in a data format that does not qualify as a standard format, the content transmission and receiving portion 260 acquires the content from the unlike media server 18. That is, the content transmission and receiving portion 260 has the function of a content acquisition portion. Note that ordinarily, the client device 30 sends the content transmission request directly to the unlike media server 18 on which the content is stored, but in a case where the data format of the content does not qualify as a standard format, the client device 30 may also send the content transmission request to the data management server 20, as described above.

The decoder 256 converts the data format of the content that the content transmission and receiving portion 260 acquired to a data format that qualifies as a standard format. For example, in a case where the data format of the content that the content transmission and receiving portion 260 acquired is AAC, the decoder 256 converts the data format from AAC to LPCM.

Next, the content transmission and receiving portion 260 can transmit to the client device 30 through the communication portion 220 the content for which the data format was converted by the decoder 256. Here, the method by which the content transmission and receiving portion 260 transmits the content may be a download method and may be a streaming method.

FIG. 22 is a sequence chart that shows a flow of a data management method in the data management system 40 according to the present embodiment. First, the data management server 20, once it confirms the presence of the unlike media server 18, requests the transmission of the metadata from the unlike media server 18 (Step S704). In response to the metadata transmission request from the data management server 20, the unlike media server 18 transmits to the data management server 20 the metadata that pertains to the content that is stored on the unlike media server 18 (Step S708). Then the data management server 20 stores the metadata it has collected from the unlike media server 18 (Step S712).

Next, the data management server 20 requests the transmission of the thumbnails from the unlike media server 18, based on thumbnail location information that indicates the location of the thumbnails and that is contained in the collected metadata (Step S716). In response to the thumbnail transmission request from the data management server 20, the unlike media server 18 transmits to the data management server 20 the thumbnails for the content that is stored on the unlike media server 18 (Step S720). Then the data management server 20 stores the thumbnails it has collected from the unlike media server 18 (Step S724).

Next, the client device 30 requests that the data management server 20 transmit the metadata (Step S728). In response to the metadata transmission request, the data management server 20 transmits the metadata and the thumbnails to the client device 30 (Step S732).

Next, the client device 30 sends to the data management server 20, along with the content URLs that are contained in the metadata that was acquired from the data management server 20, a request to transmit the content whose data format does not qualify as a standard format (Step S736). Then the data management server 20, based on the content URLs that were received from the client device 30 along with the transmission request, requests that the unlike media server 18 transmit the content (Step S740). In response to the request from the data management server 20, the unlike media server 18 transmits the content to the data management server 20 (Step S744).

The data management server 20 then converts the data format of the content that was received from the unlike media server 18 (Step S748). After or simultaneously with the data format conversion, the data management server 20 transmits to the client device 30 the content that has been converted to a data format that qualifies as a standard format (Step S752).

Thus, the data management system 40 according to the second embodiment of the present invention exhibits the effects of the data management system 10 according to the first embodiment and, even in a case where an unanticipated media server is connected to a home network, also exhibits the effect of being able to play back on the client device 30 the content that is stored on the unanticipated media server.

It should be understood by those skilled in the art that various modifications, combinations, sub-combinations and alterations may occur depending on design requirements and other factors insofar as they are within the scope of the appended claims or the equivalents thereof.

For example, in the first embodiment, the example in FIG. 13 was explained in which the Root 400 is positioned at the first level and the containers such as the Video 410, the Audio 430, the Photos 470, and the like that are subordinate to the Root 400 are positioned at the second level, but the hierarchical structure is not limited by this example. For example, in a case where the metadata that the data management server 20 has collected indicates that the content that is stored on the media server 12 is audio content only, the Root at the first level may be omitted and the Audio container may be positioned at the first level.

Further, in the first embodiment, the unit quantity of the metadata records is shown as ten records in FIG. 18, but the setting portion 240 may set the unit quantity of the metadata records to any value, such that the unit quantity may be one record, and it may be one-hundred records. Additionally, in the explanation above of the case where the data management server 20 determines at Step S652 in FIG. 18 whether or not the waiting time has elapsed, the time at Step S644 when the collection of the unit quantity of the metadata records was completed is used as the base point time. However, the timing at which the collection of the unit quantity of the metadata records starts at Step S624 may also be made a fixed cycle.

Moreover, the information that is contained in the metadata in the explanations of the embodiments is just one example. For example, the information may also include the date that the content was put on sale, the date and time that the media server 12 acquired the content, the number of times that the content has been played back, customer-provided ratings of the content, the length of the content, the data volume of the content, and the like.

It is also not necessary for each step of the processing by the data management server 20 to be performed in a temporal sequence that follows the order that is shown in the flow charts and the sequence charts. Processing that is performed in parallel and individually (for example, parallel processing and processing by an object) may also be included. The data management server 20 and the client device 30 may also be configured such that they form a single structure.

Also provided are the programs that cause an information processing device to perform the data management method described above and a storage medium that stores the programs.

What is claimed is:

1. A data management server that is connectable to a plurality of content servers that store content data and metadata associated with the content data and to a client device that acquires the content data, the data management server comprising:
   a storage device;
   a communication device for communicating with the client device and the plurality of content servers;
   a memory storing instructions for causing the data management server to:
      collect the metadata from the plurality of the content servers, the metadata including: (1) first thumbnail storage location information identifying first storage locations on the plurality of content servers of thumbnail data associated with the content data, and (2) content storage locations of the content data on the plurality of content servers;
      collect, from the plurality of content servers, the thumbnail data associated with the content data based on the first thumbnail storage location information;
      store the collected thumbnail data in the storage device at second storage locations;
      convert the metadata to the same hierarchical format based on attribute information associated with the content data;
      store the converted metadata in the storage device, the stored metadata including: (3) second thumbnail storage location information identifying the second storage locations, and (2) the content storage locations; and
      in response to a request from the client device, transmit the stored metadata to the client device; and
   a processor configured to execute the instructions stored in memory.

2. The data management server according to claim 1, wherein the stored instructions further include instructions for causing the data management server to convert the stored metadata to the same hierarchical data structure without identifying the content servers from which the metadata was collected.

3. The data management server according to claim 1, wherein the stored instructions further include instructions for causing the data management server to transmit to the client device the thumbnail data that corresponds to the stored metadata transmitted to the client device.

4. The data management server according to claim 1, wherein the stored instructions further include instructions for causing the data management server to convert a data format of the thumbnail data.

5. The data management server according to claim 1, wherein the stored instructions further include instructions for causing the data management server to:
   convert the acquired content data from a non-standard data format to a standard data format; and
   transmit to the client device the converted content data.

6. The data management server according to claim 1, wherein the content servers include digital media servers that conform to the Digital Living Network Alliance (DLNA) guidelines, and the client device is a digital media player that conforms to the DLNA guidelines.

7. A data management method of a data management server that is connectable to a plurality of content servers that store content data and metadata associated with the content data and to a client device that acquires the content data, the data management method comprising:
   collecting the metadata from the plurality of the content servers, the metadata including: (1) first thumbnail storage location information identifying first storage locations on the plurality of content servers of thumbnail data associated with the content data, and (2) content storage locations of the content data on the plurality of content servers;
   collecting, from the plurality of content servers, the thumbnail data associated with the content data based on the first thumbnail storage location information;
   storing the collected thumbnail data in a storage device of the data management server at second storage locations;
   converting the metadata to the same hierarchical format based on attribute information associated with the content data;
   storing the converted metadata in the storage device, the stored metadata including: (3) second thumbnail storage location information identifying the second storage locations, and (2) the content storage locations; and
   in response to a request from the client device, transmitting the stored metadata to the client device.

8. A non-transitory computer-readable storage medium storing a computer program that causes a data management server to perform a data management method, the data management server being connectable to a plurality of content servers that store content data and metadata associated with the content data, and to a client device that acquires the content data based on the metadata, the data management method comprising:

collecting the metadata from the plurality of the content servers, the metadata including: (1) first thumbnail storage location information identifying first storage locations on the plurality of content servers of thumbnail data associated with the content data, and (2) content storage locations of the content data on the plurality of content servers;

collecting, from the plurality of content servers, the thumbnail data associated with the content data based on the first thumbnail storage location information;

storing the collected thumbnail data in a storage device of the data management server at second storage locations;

converting the metadata to the same hierarchical format based on attribute information associated with the content data;

storing the converted metadata in the storage device, the stored metadata including: (3) second thumbnail storage location information identifying the second storage locations, and (2) the content storage locations; and in response to a request from the client device, transmitting the stored metadata to the client device.

* * * * *